US012672000B2

(12) United States Patent
Baskaran et al.

(10) Patent No.: US 12,672,000 B2
(45) Date of Patent: Jun. 30, 2026

(54) UAS AUTHENTICATION AND SECURITY ESTABLISHMENT

(71) Applicant: Lenovo (Singapore) Pte. Ltd., New Tech Park (SG)

(72) Inventors: Sheeba Backia Mary Baskaran, Friedrichsdorf (DE); Andreas Kunz, Ladenburg (DE); Dimitrios Karampatsis, Ruislip (GB)

(73) Assignee: Lenovo (Singapore) Pte. Ltd., Singapore (SG)

( * ) Notice: Subject to any disclaimer, the term of this patent is extended or adjusted under 35 U.S.C. 154(b) by 499 days.

(21) Appl. No.: 18/020,044

(22) PCT Filed: Aug. 6, 2021

(86) PCT No.: PCT/IB2021/057274
§ 371 (c)(1),
(2) Date: Feb. 6, 2023

(87) PCT Pub. No.: WO2022/029714
PCT Pub. Date: Feb. 10, 2022

(65) Prior Publication Data
US 2023/0284030 A1      Sep. 7, 2023

Related U.S. Application Data

(60) Provisional application No. 63/062,286, filed on Aug. 6, 2020.

(51) Int. Cl.
*H04M 1/66* (2006.01)
*G08G 5/55* (2025.01)
(Continued)

(52) U.S. Cl.
CPC .............. *H04W 12/71* (2021.01); *G08G 5/55* (2025.01); *G08G 5/57* (2025.01); *H04W 12/0433* (2021.01); *H04W 12/06* (2013.01)

(58) Field of Classification Search
CPC ..................................................... H04W 12/06
See application file for complete search history.

(56) References Cited

U.S. PATENT DOCUMENTS

2022/0086741 A1* 3/2022 Liao ......................... G08G 5/26

FOREIGN PATENT DOCUMENTS

CN          110121196 A      8/2019
JP          2016524855 A      8/2016
(Continued)

OTHER PUBLICATIONS

3GPP TR 23.754 V0.2.0 (Jun. 2020), 3rd Generation Partnership Project; Technical Specification Group Services and System Aspects; Study on supporting Unmanned Aerial Systems (UAS) connectivity, Identification and tracking (Release 17) (Year: 2020).*
(Continued)

*Primary Examiner* — Shantell L Heiber
(74) *Attorney, Agent, or Firm* — Kunzler Needham Hilton

(57) ABSTRACT

Apparatuses, methods, and systems are disclosed for UAS authentication and security establishment. One apparatus includes a transceiver that sends, from a first network function of a mobile wireless communication network, an authentication request message from a user equipment ("UE") to a UAS Service Supplier ("USS")/UAS Traffic Management ("UTM"), the UE comprising at least one of an unmanned aerial vehicle ("UAV") and a UAV controller ("UAV-C"). The transceiver receives, at the first network function from the USS/UTM, an authentication response message comprising a UAS identifier and a UAS security context.

12 Claims, 17 Drawing Sheets

(51) Int. Cl.

| | | |
|---|---|---|
| *G08G 5/57* | (2025.01) | |
| *H04W 12/0433* | (2021.01) | |
| *H04W 12/06* | (2021.01) | |
| *H04W 12/71* | (2021.01) | |

(56) References Cited

FOREIGN PATENT DOCUMENTS

| | | | | |
|---|---|---|---|---|
| JP | 2022545043 | A | 10/2022 | |
| WO | 2016164892 | A1 | 10/2016 | |
| WO | WO-2018178750 | A1 * | 10/2018 | ............... G08G 5/55 |
| WO | 2019079286 | A1 | 4/2019 | |
| WO | 2020200410 | A1 | 10/2020 | |
| WO | 2021041214 | A1 | 3/2021 | |

OTHER PUBLICATIONS

PCT/IB2021/057274, "Notification of Transmittal of the International Search Report and the Written Opinion of the International Searching Authority, or the Declaration", International Searching Authority, Dec. 23, 2021, pp. 1-18.

Huawei, "ID_UAS—enhancement on initial UAV authorization operation", 3GPP TSG-SA WG1 Meeting #83 S1-182199, Aug. 20-24, 2018, pp. 1-3.

3GPP, "3rd Generation Partnership Project; Technical Specification Group Services and System Aspects; Study on supporting Unmanned Aerial Systems (UAS) connectivity, Identification and tracking (Release 17)", 3GPP TR 23.754 V0.2.0, Jun. 2020, pp. 1-83.

3GPP, "3rd Generation Partnership Project; Technical Specification Group Services and System Aspects; Study on application layer support for Unmanned Aerial Systems (UAS); (Release 17)", 3GPP TR 23.755 V0.8.0, Jun. 2020, pp. 1-23.

3GPP, "3rd Generation Partnership Project; Technical Specification Group Services and System Aspects; Unmanned Aerial System (UAS) support in 3GPP; Stage 1; Release 17", 3GPP TS 22.125 V17.1.0, Dec. 2019, pp. 1-16.

3GPP, "3rd Generation Partnership Project; Technical Specification Group Services and System Aspects; Generic Authentication Architecture (GAA); Generic Bootstrapping Architecture (GBA) (Release 16)", 3GPP TS 33.220 V16.1.0, Jul. 2020, pp. 1-93.

3GPP, "3rd Generation Partnership Project; Technical Specification Group Services and System Aspects; Security architecture and procedures for 5G system (Release 16)", 3GPP TS 33.501 V16.3.0, Jul. 2020, pp. 1-248.

CATT, "KI #2&3, New Sol: Authentication and authorization for UAV and UAVC", 3GPP TSG-SA WG2 Meeting #139E S2-2004079, Jun. 1-12, 2020, pp. 1-4.

Qualcomm et al., "KI#1, KI#2, KI#3, KI#7, New Sol: Solution for UAV authentication and authorization by USS/UTM", SA WG2 Meeting #139e S2-2004672, Jun. 1-8, 2020, pp. 1-13.

Qualcomm Incorporated, "Details from the SA2 UAS moderated e-mail discussion", 3GPP TSG-SA3 Meeting #99e S3-201260, May 11-15, 2020, pp. 1-27.

Lenovo, Motorola Mobility, "Solution on UAS Authentication, Authorization and Security Aspects", 3GPP TSG-SA3 Meeting #100e S3-202607, Aug. 17-28, 2020, pp. 1-5.

Interdigital, "KI#3 Solution Network assisted positioning for UAV", 3GPP TSG-SA WG6 Meeting #34 S6-192060, Nov. 11-15, 2019, pp. 1-4.

3GPP, "3rd Generation Partnership Project; Technical Specification Group Services and System Aspects; Study on security aspects of Unmanned Aerial Systems (UAS) (Release 17)", 3GPP TR 33.854 V0.6.0, May 2021, pp. 1-63.

Huawei, Hisilicon, "UAS authorization considering association of the UAV and UAV controller", SA WG2 Meeting #136AH S2-2000682, Jan. 13-17, 2020, pp. 1-3.

Samsung, "KI #4, New Sol: UAV/UAVC Tracking", SA WG2 Meeting #139E S2-2003938, Jun. 1-12, 2020, pp. 1-3.

CATT, "KI#4, New Sol: UAV and UAV Controller tracking based on LCS mechanism", 3GPP TSG-SA WG2 Meeting #139E S2-2004681, Jun. 1-12, 2020, pp. 1-3.

* cited by examiner

402

404

406

408

410

800

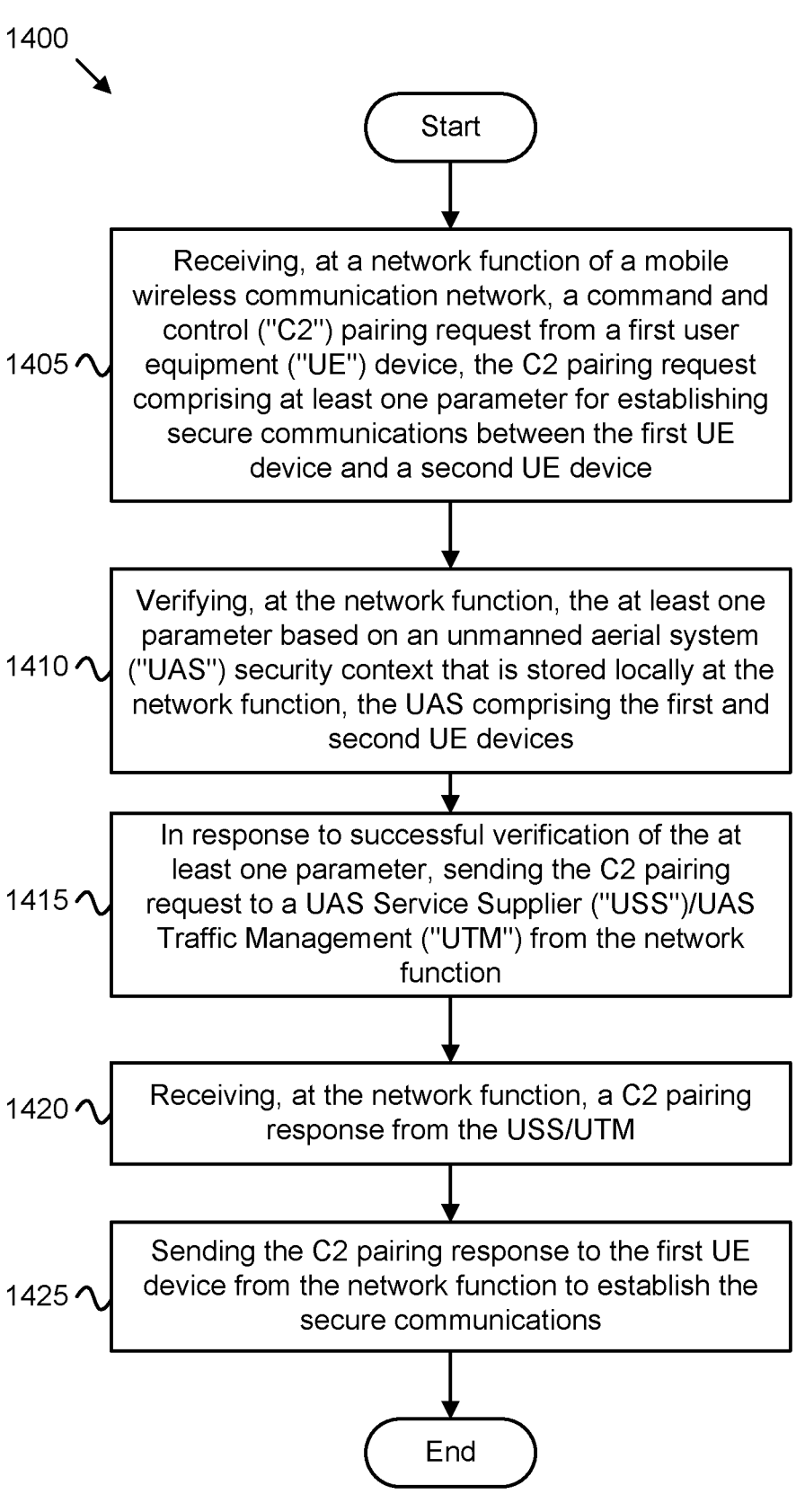

1400

Start

1405 —— Receiving, at a network function of a mobile wireless communication network, a command and control ("C2") pairing request from a first user equipment ("UE") device, the C2 pairing request comprising at least one parameter for establishing secure communications between the first UE device and a second UE device 1410 —— Verifying, at the network function, the at least one parameter based on an unmanned aerial system ("UAS") security context that is stored locally at the network function, the UAS comprising the first and second UE devices 1415 —— In response to successful verification of the at least one parameter, sending the C2 pairing request to a UAS Service Supplier ("USS")/UAS Traffic Management ("UTM") from the network function 1420 —— Receiving, at the network function, a C2 pairing response from the USS/UTM 1425 —— Sending the C2 pairing response to the first UE device from the network function to establish the secure communications End

FIG. 14

UAS AUTHENTICATION AND SECURITY ESTABLISHMENT

CROSS-REFERENCE TO RELATED APPLICATIONS

This application claims priority to U.S. Provisional Patent Application No. 63/062,286 entitled "APPARATUSES, METHODS, AND SYSTEMS FOR UAS COMMAND AND CONTROL SECURITY SETUP AND MANAGEMENT IN 3GPP NETWORKS" and filed on Aug. 6, 2020, for Sheeba Backia Mary Baskaran, et al., which is incorporated herein by reference.

FIELD

The subject matter disclosed herein relates generally to wireless communications and more particularly relates to UAS authentication and security establishment.

BACKGROUND

In certain wireless communication systems, a User Equipment device ("UE") is able to connect with a fifth-generation ("5G") core network (i.e., "5GC") in a Public Land Mobile Network ("PLMN"). In wireless networks, unmanned aerial systems ("UASs") may include unmanned aerial vehicles ("UAVs"), UAV controllers ("UAV-Cs"), UAS service suppliers ("USSs") and UAS traffic management ("UTM") functions that communicate via wireless communication systems.

BRIEF SUMMARY

Disclosed are procedures for UAS authentication and security establishment. Said procedures may be implemented by apparatus, systems, methods, and/or computer program products.

One method of a network function (e.g., UCFS, UAS NF, NEF) in a mobile communication network includes sending, from a first network function of a mobile wireless communication network, an authentication request message from a user equipment ("UE") to a UAS Service Supplier ("USS")/UAS Traffic Management ("UTM"), the UE comprising at least one of an unmanned aerial vehicle ("UAV") and a UAV controller ("UAV-C"). The method includes, in certain embodiments, receiving, at the first network function from the USS/UTM, an authentication response message comprising a UAS identifier and a UAS security context, the UAS security context comprising a UAS root key and a UAS root key identifier.

Another method of a network function (e.g., UCFS, UCF) includes receiving, at a network function of a mobile wireless communication network, a command and control ("C2") pairing request from a first user equipment ("UE") device, the C2 pairing request comprising at least one parameter for establishing secure communications between the first UE device and a second UE device. The method, in one embodiment, includes verifying, at the network function, the at least one parameter based on an unmanned aerial system ("UAS") security context that is stored locally at the network function, the UAS comprising the first and second UE devices. In one embodiment, the second method include, in response to successful verification of the at least one parameter, sending the C2 pairing request to a UAS Service Supplier ("USS")/UAS Traffic Management ("UTM") from the network function, receiving, at the network function, a C2 pairing response from the USS/UTM, and sending the C2 pairing response to the first UE device from the network function to establish the secure communications.

One method of a User Equipment device ("UE") (e.g., a UAV, a UAV-C) includes sending, from a first user equipment ("UE") device to a network function of a mobile wireless communication network, a command and control ("C2") pairing request for establishing secure communications between the first UE device and a second UE device, the C2 pairing request comprising at least one of an identifier for the first UE device, an identifier for the second UE device, an identifier for an unmanned aerial system ("UAS") comprising the first and second UE devices, security capability information for the first UE device, a UAS authorization token, nonce, a UAS Security information identifier, a UAS root key, and a UAS session key identifier.

In one embodiment, the method includes receiving, from the network function, a C2 pairing response comprising at least one of a success indicator, a UAS session key identifier, a UAS session key, UAS security information, a selected security algorithm, and an address for the second UE device. In one embodiment, the method includes deriving a second UAS session key using a locally-stored UAS root key and a second UAS session key identifier using the second UAS session key, verifying that the second UAS session key identifier matches the UAS session key identifier received in the C2 pairing response, deriving at least one security key for securing communications between the first and second UE devices based on the UAS session key, and establishing secure communications with the second UE device using the at least one security key.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 14 is a flowchart diagram illustrating one embodiment of a method for UAS authentication and security establishment.

DETAILED DESCRIPTION

Figure 1:
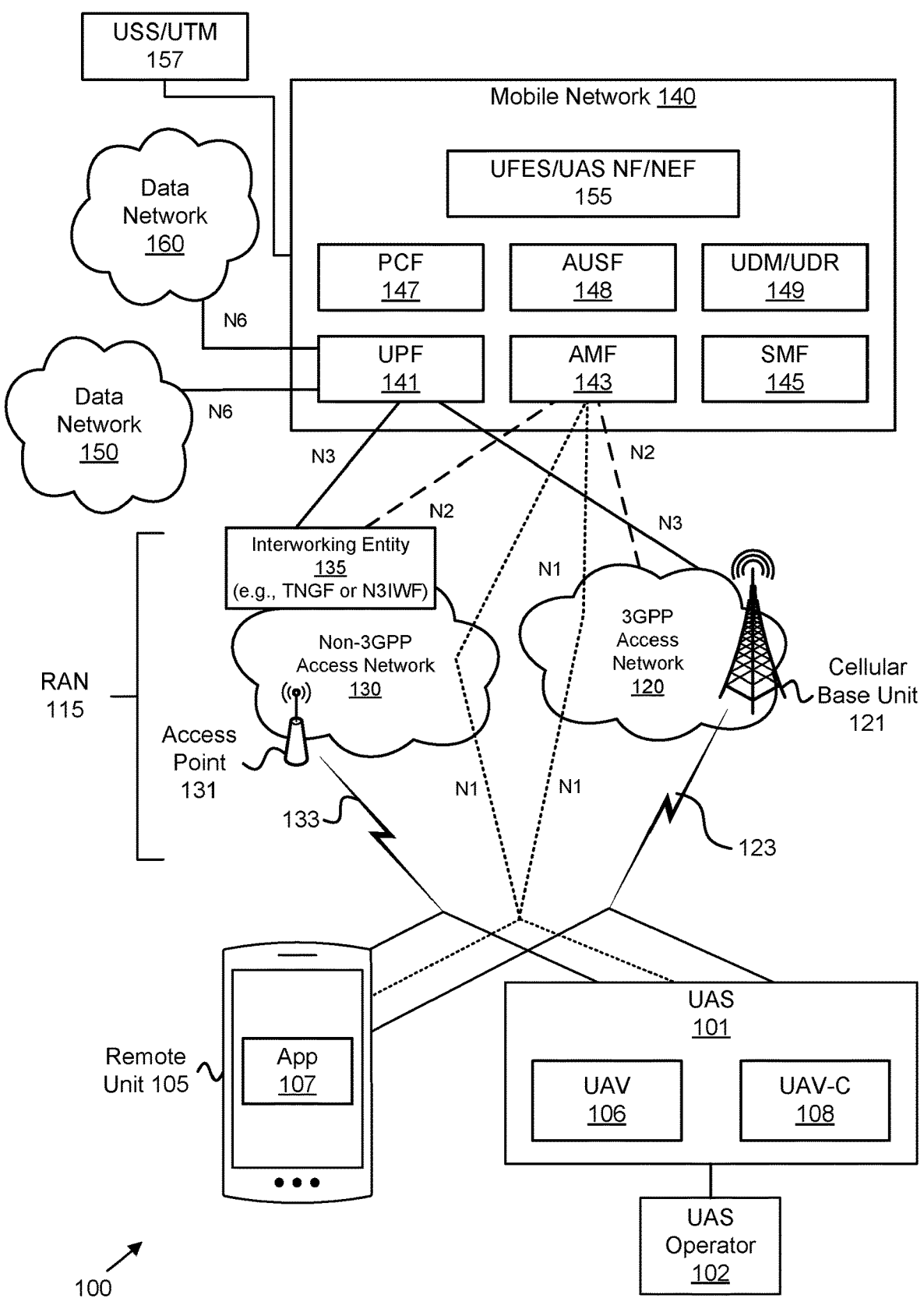
FIG. 1 is a schematic block diagram illustrating one embodiment of a wireless communication system for UAS authentication and security establishment.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for UAS authentication, authorization, and security establishment. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

In one embodiment, 3GPP systems support UASs, providing ubiquitous coverage, seamless mobility, high reliability, and more importantly enhanced security and safety for UAV communication, which is controlled by various parties such as a UAV-C, UAS service supplier/UAS traffic management ("USS/UTM") and/or a third party authorized entity ("TPAE"). In certain embodiments, conventional 5G systems do not support UAS operations (e.g., command and control ("C2") signaling between UAV and controlling parties such as a UAV-C, a USS/UTM, and a TPAE over the 5G infrastructure and thus no security feature is available for UAS communication protection.

The solutions proposed in this disclosure provide C2 security establishment procedures to support data protection (e.g., confidentiality, integrity, and replay) for the C2 signaling sent to a UAV by a UAV-C, a USS/UTM and/or a TPAE to enhance the overall UAS security in the 5G system.

FIG. 1 depicts a wireless communication system 100 for UAS authentication and security establishment, according to embodiments of the disclosure. In one embodiment, the wireless communication system 100 includes at least one remote unit 105, a Fifth-Generation Radio Access Network ("5G-RAN") 115, a mobile core network 140, a UAV gateway 109, and a UAS 101. The 5G-RAN 115 and the mobile core network 140 form a mobile communication network. The 5G-RAN 115 may be composed of a 3GPP access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the AMF 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In one embodiment, the UAS 101 comprises components, networks, hardware, software, and/or the like for conducting unmanned aircraft operations between a UAV 106, e.g., a drone, and a UAV controller 108. The UAV 106 may refer to an aircraft without a human pilot, crew, or passengers that is remotely controlled using a UAV controller 108. A UAV controller 108 may refer to device that is configured to wirelessly send instructions to the UAV 106 for controlling the UAV, e.g., for controlling the speed, direction, orientation, and/or the like of the UAV, e.g., via the mobile network 140, an access network 120, 130, and/or the like. The UAS operator 102 may be the person who operates the UAV 106 (e.g., via the UAV controller 108) and who, typically, requests flight authorizations. The UAV 106 and UAV controller 108 may each be UEs in the wireless communication system 100 and/or may include an instance of a remote unit 105. As such, the UAV 106 and/or the UAV controller 108 may communicate with an access network 120 to access services provided by a mobile core network 140.

In some embodiments, the UAV 106 and/or the UAV-C controller 108 communicates with a UAV flight enablement subsystem ("UFES")/a UAS network function ("UAS-NF")/a network exposure function ("NEF") 155 (for simplicity, referred to collectively herein as a UFES 155) and/or a USS/UTM 157 function via a network connection with the mobile core network 140. In one embodiment, the UAS network function is supported by the NEF and used for external exposure of services to the USS. The UAS-NF makes use of existing NEF/SCEF exposure services for UAV/UAS authentication/authorization, for UAV flight authorization, for UAV-UAV-C pairing authorization, and related revocation; for location reporting, and control of QoS/traffic filtering for C2 communication. The USS/UTM 157, in one embodiment, provides a set of overlapping USSs that assist UAV 106 operators 102 in conducting safe and compliant operations. The services may include deconfliction of flight plans, remote identification, and/or the like.

In one embodiment, the UAV 106 and/or UAV controller 108 may establish a PDU session (or similar data connection) with the mobile core network 140 using the RAN 115. The mobile core network 140 may then relay traffic between the UAV 106 and the UAV controller 108 and the packet data network 150 using the PDU session.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N31WF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF ("UPF") 141. The mobile core network 140 also includes multiple control plane functions including, but not limited to, an Access and Mobility Management Function ("AMF") 143 that serves the 5G-RAN 115, a Session Management Function ("SMF") 145, a Policy Control Function ("PCF") 146, an Authentication Server Function ("AUSF") 147, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 146 is responsible for unified policy framework, providing policy rules to CP functions, access subscription information for policy decisions in UDR. The AUSF 147 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as an MME, S-GW, P-GW, HSS, and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfoxx, and the like. For example, in an 4G/LTE variant involving an EPC, the AMF 143 may be mapped to an MME, the SMF mapped to a control plane portion of a PGW and/or to an MME, the UPF 141 may be mapped to an SGW and a user plane portion of the PGW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

To solve the problem of securing UAS communications over a 5G system, described above, the present disclosure proposes solutions that provide the C2 security establishment procedures to support data protection (e.g., confidentiality, integrity, and replay) for C2 signaling sent to a UAV by a UAV-C, a USS/UTM and/or a TPAE to enable overall UAS security in the 5G System.

In one embodiment, the 3GPP system supports UASs, providing ubiquitous coverage, seamless mobility, high reliability, and enhanced security and safety. For example, 5G systems can be used to enable UAS remote identification and tracking beyond the line-of-sight scenarios and only authorized UASs may be allowed to operate.

In certain embodiments, security is critical to support secure UAS system deployment, e.g., confidentiality protection of identities, protection against spoofing attacks, different levels of integrity and privacy protection for the different connections, signaling and data, non-repudiation of data exchange at the application layer, and/or the like. There is a need to provide solutions to ensure a robust overall system that can meet the needs of the parties involved, e.g., regulators, network operators, and/or the like, which necessitates consideration of the security aspects of the UAS system.

In certain embodiments, the following architecture requirements and assumptions are considered for UAS connectivity, identification, and tracking. In one embodiment, the 3GPP system shall enable a UTM 157 to associate the UAV 106 and UAV controller 108 and identify them for both 3GPP networked UAV controller 108 and non-3GPP networked UAV controller 108.

In one embodiment, each UAS 101 consists of one UAV Controller 108 and one UAV 106. The UTM 157 may include a set of functionalities defined outside the 3GPP system and subject to specific regional requirements. Connectivity for command and control of a UAV 106 may be between the UAV 106 and, mutually exclusively, a UAV Controller 108, or a TPAE, or the UTM 157.

In one embodiment, a UAV 106 is assigned, and a networked UAV-C 108 may be assigned, a CAA-level UAV Identity by functions in the aviation domain (e.g., USS 157) or by functions in the USS/UTM 157. This assigned identity may be used for Remote Identification and Tracking. In one embodiment, a 3GPP UAV ID is used by the 3GPP system to identify the UAV 106.

For networked UAV controllers 108 and non-networked UAV controllers 108, in one embodiment, pairing between the UAV 106 and the UAV controller 108 for the use of UAV3 or UAVS reference points may be at least authorized, or even authenticated. The pairing authorization/authentication, when performed, is authorized by the USS/UTM, not by the 3GPP system. The 3GPP system enables such authorization process. The result of such authorization/authentication are made known to the MNO in order to enable the USS/UTM 157 to enable the connectivity between the UAV 106 and the UAV controller 108. In one embodiment, the UAV 106 is authorized for connectivity to USS 157 over a UAV9 reference point based on existing MNO policies and is allowed to establish connectivity with a data network name ("DNN") to exchange traffic with the USS 157 without USS authorization.

In one embodiment, the subject matter disclosed herein proposes solutions to establish C2 security contexts and protect C2 (application data) traffic carried over between a UAV 106 and various parties such as a UAV-C 108, a UTM/USS 157, a TPAE, and/or the like.

In general, the disclosure focuses on UAS Authentication and Key management and a C2 Security Set up Procedure. For UAS Authentication and Key management, a UAS Control Function ("UCF"), otherwise called as UAS Management Function ("UASMF")/UAS Network Function (("UASNF"), is introduced, which functions in the 3GPP Network on behalf of UTM/USS to enforce UAS based control and management operations. In one embodiment, the UAS Network Function is supported by the NEF and used for external exposure of services to the USS. The UASNF makes use of existing NEF/SCEF exposure services for UAS/UAV authentication/authorization, for UAV flight authorization, for UAV-UAVC pairing authorization, and related revocation; for location reporting, and control of QoS/traffic filtering for C2 communication. It is noted that the UCF can be related and equivalent to the UFES 155 and UAS AF/UASNF, e.g., as defined in TR 23.754. Therefore, the disclosure will use a common terminology UFES 155 in the rest of the disclosure and all the new features and operations described in this disclosure for UFES 155 is applicable to the new 3GPP Network Function UCF.

In one embodiment, a USS/UTM 157 provides C2 Assistance Information to the other Network Functions ("NF") (e.g., such as UCF/UFES/UASNF/AMF/SMF) in the 3GPP network to assist in appropriate UAV3 interface (e.g., intra PLMN UAV3 or inter PLMN UAV3) selection. The C2 Assistance Information may include UAV3 Type Indicator and UAV-C Serving PLMN ID.

In one embodiment, a USS/UTM 157 assigns the UAS an identifier during successful UAS authentication and provides the identifier to a UAV 106 and/or UAV-C 108 via 3GPP NFs. The UAS ID, as used herein, may uniquely identify the UAV 106 and UAV-C 108 pair that forms the UAS 101. In is noted that, in one embodiment, UAS ID usage described in this disclosure is applicable to any ID assigned for the UAV 106 and UAV-C 108 pairing functionality.

In one embodiment, during successful UAS authentication (e.g., Application or EAP-based authentication), in one embodiment, a key $K_{UAS}$ is derived (e.g., a root key to derive other security keys for UAS related data protection) from the preconfigured Long-Term Credentials. In further embodiments, during successful UAS authentication, an Authorization Token is derived to enable USS/UTM 157 or UFES 155 to authorize the UAV C2 association with a UAV-C 108. The inputs used in Authorization Token may include a UAS ID, a UAV-CAA-Level ID, a UAV-C ID, a Nonce, and a Timestamp.

In one embodiment, the Authorization Token is assigned a validity time/lifetime to define the time duration within which an authorization token can be successfully used by the UAV 106 for association or getting any service from UTM/USS 157. In certain embodiments, post successful UAS authentication between UAV 106 and UTM/USS 157, the C2 security mode command procedure is proposed to set up C2 security context for the UAV 106 with the UFES 155 or the UTM/USS 157.

In one embodiment, the UAS key hierarchy comprising the key $K_{UAS}$ (e.g., the UAS root key), $K_{UAS-Sess}$ (e.g., the UAS/C2 Session key), CCEK (e.g., the Command Control Encryption Key) and CCIK (e.g., the Command Control Integrity Key) are proposed to enable UAS Security.

Regarding the C2 security setup procedure, session keys are established for C2 (application data) confidentiality, and integrity protection in the following scenarios: between UAV 106 and UAV-C 108 over UAV3 interface, between UAV 106 and TPAE over UAV4 interface, and between UAV 106 and UFES/UTM/USS over UAV9 interface.

The disclosure also describes an alternative solution to support SEAL based authentication and key management to enable UAS communications with a 5G system and authentication and key management for applications ("AKMA") based UAS Security management.

Figure 2:
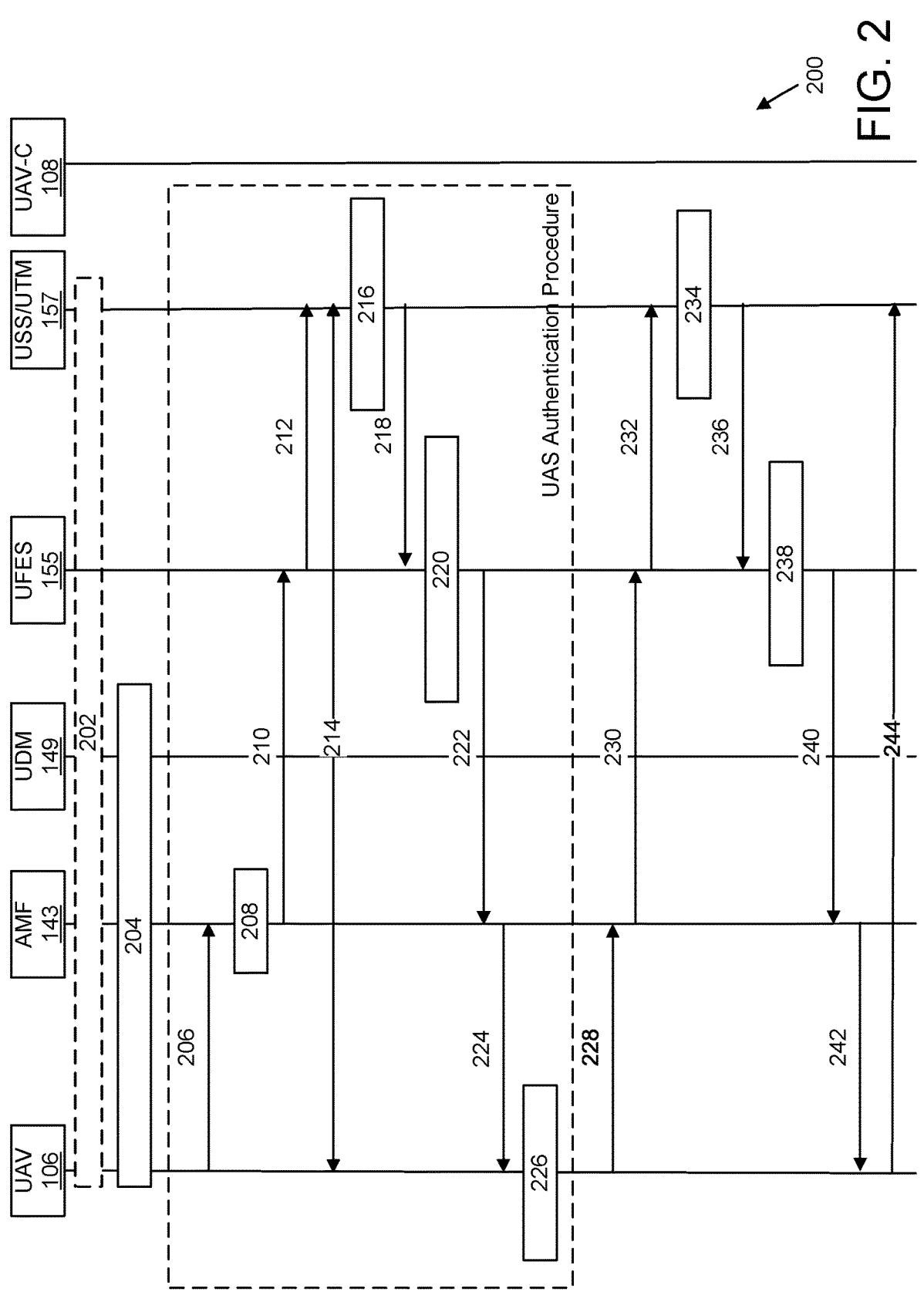
FIG. 2 is a signal flow diagram illustrating one embodiment of a procedure for UAS Authentication and Key establishment.

In one embodiment, the UAS authentication and key agreement procedure between UAV 106 and UAV-C 108 and USS/UTM 157, along with the clarification of how a C2 security context is established in the USS/UTM 157 for UAV communication is described. The embodiment also describes how the same procedure can be supported in the Evolved Packet System ("EPS") 4G network. The UAS authentication procedure 200 shown in FIG. 2 is described in the following steps.

In one embodiment, at steps 1 and 2 (see blocks 202 and 204), as a precondition, the UAV 106 is registered with the USS/UTM 157 by the UAS 102 operator using any method outside the 3GPP operator scope. The UAV 106 registers with the 5G network by performing the primary authentication, e.g., as specified in TS 33.501. In one embodiment, the AMF 143, based on the UAV 106 subscription information fetched from the UDM/UDR 149 determines to trigger UAS authentication and send UAS authentication Required Indicator in the Registration Accept message.

At step 3, in one embodiment, (see messaging 206-226), the UAV 106 on receiving the 'UAS Authentication Required' Indicator from the AMF 143, initiates and performs UAS authentication with the USS/UTM 157 via the 5G network control plane functions (e.g., AMF 143, SMF 145, UFES 155, and/or the like). The procedure 200 defined here, in one embodiment, specifies the UAS authentication related request/response information exchanged between the UAV 106 and the USS/UTM 157, and so the information can either be carried over an application-based authentication protocol in NAS layer or over an EAP-based authentication protocol. The UAS authentication message can be sent over the NAS connection, which is both confidentiality and integrity protected using 5G NAS security.

At step 3*a*, in one embodiment, (see messaging 206) the UAV 106 sends a UAS Authentication request message that includes a CAA Level UAV ID with USS Routing Information (e.g., the USS Routing Information may be preconfigured in the UAV 106 by the USS 157 in step 1 or may be part of the CAA Level UAV ID), a flight path data, a Target CAV-C ID (e.g., to form the UAS).

At step 3b, in one embodiment, (see block 208), if the AMF 143 receives a CAA Level UAV ID with USS Routing Information, the AMF 143 locally stores the CAA Level UAV ID with USS Routing Information. At step 3c, in one embodiment, (see messaging 210), based on the USS routing Information, the AMF 143 forwards the UAS Authentication request message to the UFES 155 (e.g., either directly or via an SMF 145). Alternatively, in one embodiment, based on the USS routing Information, the AMF 143 can also forward the UAS Authentication request message to the USS/UTM 157 (e.g., either directly or via a UFES 155).

At step 3d, in one embodiment, (see messaging 212) the UFES 155 locally stores the CAA Level UAV ID, if received, and forwards the received UAS Authentication request message to the USS/UTM 157. At step 3e, in one embodiment, (see messaging 214) the USS/UTM 157 performs authentication method specific message exchange (e.g., application-based authentication or EAP-based authentication) with the UAV 106 to authenticate the UAV 106 and to authenticate itself to the UAV 106.

At step 3f, in one embodiment, (see block 216) the USS/UTM 157, on performing a successful authentication, verifies the preconfigured CAA Level UAV ID, if provided by the UAV 106 or based on the UAV subscription, and assigns a new CAA Level UAV ID to the UAV 106. Further, in one embodiment, if a UAV-C ID is received from the UAV 106 in the authentication request, the USS/UTM 157, based on the UAV 106 and/or UAS subscription, verifies if the UAV 106 is authorized to get associated with the UAV-C ID to form the UAS 101.

In one embodiment, if the UAV ID and UAV-C ID association verification is successful, the USS/UTM 157 assigns a UAS ID to uniquely identify the UAS 101 that is formed by the UAV 106 and the UAV-C 108. The USS/UTM 157, in one embodiment, after every successful UAS authentication of any UAV 106 or UAV-C 108, locally stores the ID of UAV 106 and the UAV-C 106, the Serving Network Information of the UAV 106 and the UAV-C 108 (e.g., the SN ID/Serving PLMN ID and Home PLMN ID).

Further, in one embodiment, the USS/UTM 157, based on the UAS subscription, activity report, and authentication status information (e.g., the UAS Status Record) available in the USS/UTM 157, checks if the UAV-C 108 is recently UAS authenticated or not. If the UAV-C 108 authentication status record in the USS/UTM 157 indicates that it is recently authenticated, in one embodiment, then the USS/UTM 157 generates C2 Assistance information for the UAV 106 based on the serving network identifier of the UAV-C 108. The C2 Assistance Information information element (1E") can include a UAV-C ID, a UAV3 Type Indicator (e.g., Intra PLMN UAV3/Inter PLMN UAV3), and UAV-C Serving Network ID.

If the UAS authentication is successful, in one embodiment, the USS/UTM 157 generates a UAS root key $K_{UAS}$ from the long-term credential stored in the UAV/UAS subscription information in the USS/UTM 157. The $K_{UAS}$ ID can be derived by the USS/UTM 157 simply by generating the hash of the UAS root key with the UAS ID/CAA Level UAV ID. The $K_{UAS}$ ID is used to uniquely identify the UAS root key in the USS/UTM 157.

The USS/UTM 157, in one embodiment, further generates an authorization token using inputs such as CAA Level UAV ID, UAV-C ID, UAS ID and $K_{UAS}$. The USS/UTM 157 also assigns a lifetime (e.g., a validity period or time duration) for the authorization token to be used by the 3GPP network to authorize the UAV 106 during the C2 security set up for the UAV communication.

In one embodiment, the $K_{UAS}$ ID is generated as follows: $K_{UAS}$ ID: Hash ($K_{UAS}$‖CAA Level UAV IDHUAS ID). The hash function used to generate $K_{UAS}$ ID may be any hash function, for example, SHA-2, SHA-3, and/or the like.

At step 3g, in one embodiment, (see messaging 218), in response to the successful UAS authentication, the USS/UTM 157 sends the UAS authentication response message to the UFES 155. The UAS authentication response message may include a Success Indication, a CAA Level UAV ID, a UAS ID, C2 Assistance Info, an Authorization Token, and a UAS Security context that includes the $K_{UAS}$ ID and the key $K_{UAS}$.

At step 3h, in one embodiment, (see block 220) the UFES 155 receives the UAS authentication response message and locally stores the received CAA Level UAV ID, UAS ID, C2 Assistance Information (e.g., UAV-C ID, UAV3 Type Indicator (Intra PLMN UAV3/Inter PLMN UAV3) and UAV-C Serving Network ID), Authorization Token and UAS Security context ($K_{UAS}$ ID, $K_{UAS}$) as part of the UAS information (or UAS Security Context) for the UAV 106.

At step 3i, in one embodiment, (see messaging 222) the UFES 155 sends the received UAS authentication response message to AMF 143. The UAS authentication response message includes a Success Indication, CAA Level UAV ID, UAS ID, C2 Assistance Information, an Authorization Token, and a UAS Security context ($K_{UAS}$ ID, $K_{UAS}$).

At step 3j, in one embodiment, (see messaging 224), the AMF 143 locally stores the received CAA Level UAV ID, UAS ID, C2 Assistance Information (e.g., UAV-C ID, UAV3 Type Indicator (Intra PLMN UAV3/Inter PLMN UAV3) and UAV-C Serving Network ID), Authorization Token, and UAS Security context ($K_{UAS}$ ID, $K_{UAS}$) as part of the UAS information (or UAS Security Context) for the UAV 106.

The AMF 143, in one embodiment, further sends the UAS authentication response message to the UAV 106. The UAS authentication response message includes a Success Indication, CAA Level UAV ID, UAS ID, Authorization Token, UAS Security context ($K_{UAS}$ ID).

The AMF 143, in one embodiment, uses the locally stored C2 Association information while initiating the C2 connection over the UAV3 interface for the UAV 106 and UAV-C 108 communication.

At step 3k, in one embodiment, (see block 226) the UAV 106 receives the UAV authentication response message and on receiving 'Success Indication', the UAV 106 generates the UAS Security context ($K_{UAS}$ ID, $K_{UAS}$), similar to the USS/UTM 157, from the long-term credentials preconfigured in the UAV 106 in step 1 and using the IDs (e.g., as in step 3f) received in the UAS authentication response message.

The UAV 106, in one embodiment, verifies if the locally generated $K_{UAS}$ ID matches with the $K_{UAS}$ ID received in step 3j. If both locally generated $K_{UAS}$ ID and the received $K_{UAS}$ ID matches, in one embodiment, then the UAV 106 considers the UAS authentication as successful and locally stores the CAA Level UAV ID, UAS ID, Authorization Token, UAS Security context ($K_{UAS}$ ID) along with the most recently derived $K_{UAS}$ as part of a UAS Security Context. The UAV 106, in one embodiment, uses the $K_{UAS}$ ID to uniquely identify the $K_{UAS}$.

In one embodiment, to support UAS Root Key derivation and C2 Assistance Information Generation during UAS specific PDU Session Establishment Procedure, the USS/

UTM 157 can perform step 3f when a UAV Operation Request is received from the UFES 155 in step 3d (instead of an Authentication Request). Then, in one embodiment, step 3f described above may be performed and the USS/ UTM 157 sends the information sent in step 3g in the UAV Operation Response message (instead of sending it in the UAS Authentication Response) to the UFES 155. The UAV Operation Response, in one embodiment, includes a Success Indication, a CAA Level UAV ID, a UAS ID, C2 Assistance Info, an Authorization Token, and a UAS Security context ($K_{UAS}$ ID, $K_{UAS}$).

At step 4a, in one embodiment, (see messaging 228) the UAV 106 initiates the C2 security set up procedure with USS/UTM 157 to establish the C2 session security between the UAV 106 and the USS/UTM 157. The UAS/C2 Security Setup Procedure is sent over NAS connection protected with NAS security/or over RRC connection.

The UAV 106, in one embodiment, sends the C2 Security Establishment Request message to the AMF 143 in a NAS Container. The C2 Security Establishment Request message, in one embodiment, includes a UAV ID (e.g., CAA Level UAV ID) with Routing Information, a UAS ID, an Authorization Token, a Nonce_1, Security Capabilities, and $K_{UAS}$ ID.

At step 4b, in one embodiment, (see messaging 230) the AMF 143 decrypts the NAS container and forwards the received C2 Security Establishment Request message to the UFES 155. At step 4c, in one embodiment, (see messaging 232) the UFES 155 forwards the C2 Security Establishment Request message to the USS/UTM 157.

At step 4d, in one embodiment, (see block 234 and messaging 236) the USS/UTM 157 verifies the $K_{UAS}$ ID, UAS ID, and Authorization token with the locally stored UAS security context information related to the UAS ID. In one embodiment, if the UAS security context that is related to a $K_{UAS}$ ID is available, then the USS/UTM 157 generates a Nonce_2 and derives a C2 Session Key ($K_{UAS\_Sess}$) from the UAS root Key ($K_{UAS}$) that is stored locally, as shown below:

$K_{UAS\_Sess}$=KDF ($K_{UAS}$, UAS ID, CAA Level UAV ID, Nonce1, Nonce2)

$K_{UAS\_Sess}$ ID: Hash ($K_{UAS\_Sess}$)

CCEK=KDF ($K_{UAS\_Sess}$, UAS ID, Ciphering Algorithm ID, C2 Type ID)

CCIK=KDF ($K_{UAS\_Sess}$, UAS ID, Integrity Algorithm ID, C2 Type ID)

The USS/UTM 157, in one embodiment, further derives the $K_{UAS\_Sess}$ ID (e.g., 16-bit length) to uniquely identify the UAS session key. The USS/UTM 157, in one embodiment, based on the local configuration and the UAV security capabilities, selects the ciphering and integrity algorithms for the C2 protection. Further, in one embodiment, the USS/UTM 157 provides the Selected Security algorithms (ciphering and integrity), Nonce_2, $K_{UAS\_Sess}$ ID, and the $K_{UAS\_Sess}$ Key to the UFES 155 in the C2 Security Establishment response message to the UFES 155.

At step 4e, in one embodiment, (see block 238) the UFES 155 locally stores the received $K_{UAS\_Sess}$ ID and the $K_{UAS\_Sess}$ Key along with UAS Security context information. In one embodiment, the UFES 155 further sends the received C2 Security Establishment response message to the AMF 143, where the C2 Security Establishment response message includes the Selected Security algorithms (ciphering and integrity), Nonce_2, and $K_{UAS\_Sess}$ ID.

At step 4f, in one embodiment, (see messaging 240) the AMF 143 sends the received C2 Security Establishment response message to the UAV 106, where the C2 Security Establishment response message includes the Selected Security algorithms (ciphering and integrity), Nonce_2, and $K_{UAS\_Sess}$ ID.

In one embodiment, at step 4g (see messaging 242), the UAV 106, on receiving the Nonce_2, generates the C2 Session Key ($K_{UAS\_Sess}$) from the UAS root Key ($K_{UAS}$) locally stored, like the USS/UTM 157. The UAV 106 further generates the $K_{UAS\_Sess}$ ID, like the USS/UTM 157, to check if the C2 session security is synchronized with the USS/ UTM 157. If the C2 Session key and ID, in one embodiment, are found to be synchronized, then the UAV 106 finds that the UAS session key set up is successful. The UAV 106, in one embodiment, locally stores the received Selected Security algorithms (ciphering and integrity) and Nonce_2.

At step 4h, in one embodiment, (see messaging 244) the UAV 106 sends the C2 Security Establishment Complete message to USS/UTM 157, which is ciphered, and integrity protected (e.g., using CCEK and CCIK derived above) at the C2 application level using the fresh $K_{UAS\_Sess}$ Key. In one embodiment, step 4h can be sent either over a NAS connection or using user plane signalling. In one embodiment, based on the operator's 102 deployment scenario, as an option, the UAS/C2 Security Setup Procedure may be alternatively performed between the UAV 106 and the UFES 155, where the UFES 155 is used instead of the USS/UTM 157 in steps 4a-4h, described above.

Figure 3:
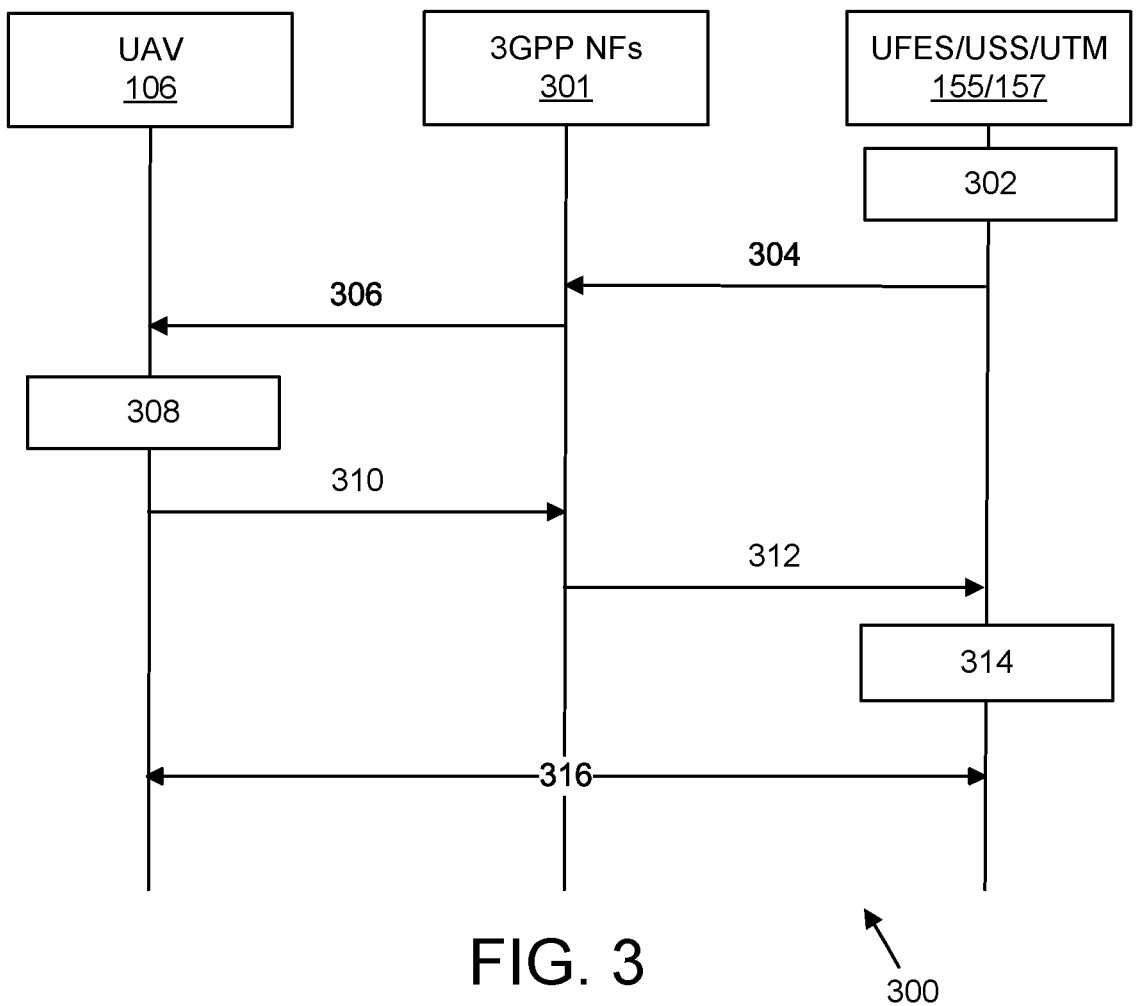
FIG. 3 is a signal flow diagram illustrating one embodiment of a procedure for C2 Security Mode Command.

In an alternate embodiment, the UAS/C2 Security set up between UAV 106 and USS/UTM 157 can be performed using the C2 Security mode command procedure shown in FIG. 3. In one embodiment, instead of steps 4a-4h shown in FIG. 2, steps 1-6 of FIG. 3 can be performed to set up security between a UAV 106 and a USS/UTM 157.

At step 1, in one embodiment, (see block 302) the UFES 155 and/or the USS/UTM 157, after a successful UAS authentication, contains the UAS root key, which is derived and stored as described in FIG. 2, step 4d above. In one embodiment, the UFES 155 and/or the USS/UTM 157 further generates a Nonce_1 to use as input in the session key derivation.

In one embodiment, the UFES 155 and/or the USS/UTM 157 derives the UAS session security key ($K_{UAS\_Sess}$) and session key identifier ($K_{UAS\_Sess}$ ID) as follows:

$K_{UAS\_Sess}$=KDF ($K_{UAS}$, UAS ID, CAA Level UAV ID, Nonce1) $K_{UAS\_Sess}$ ID: Hash ($K_{UAS\_Sess}$) CCEK=KDF ($K_{UAS\_Sess}$, UAS ID, Ciphering Algorithm ID, C2 Type ID) CCIK=KDF ($K_{UAS\_Sess}$, UAS ID, Integrity Algorithm ID, C2 Type ID)

In one embodiment, the UFES 155 and/or the USS/UTM 157 sends the C2 Security mode command message to the UAV 106 (e.g., via the 3GPP network functions AMF 143, UFES 155, and/or the like). The C2 Security mode command message, in one embodiment, includes a UAS ID, Nonce_1, Selected Ciphering and Integrity protection algorithm Identifier(s), $K_{UAS}$ ID and/or $K_{UAS\_Sess}$ ID. The C2 Security mode command message, in one embodiment, is integrity protected using the newly derived CCIK and selected integrity algorithm.

At step 2, in one embodiment, (see messaging 304 and 306) the 3GPP NF(s) 301 receive the C2 Security mode command message and forward the received C2 Security mode command message to the UAV 106.

At step 3, in one embodiment, (see block 308) the UAV 106 verifies the locally stored $K_{UAS}$ ID with the received $K_{UAS}$ ID and if both matches, the UAV 106 uses the received Nonce_1 to derive the UAS session key and UAS session key ID, similar to the UFES 155 and/or the USS/UTM 157, as specified in step 1 above. The UAV 106, in one embodiment, further verifies if the newly derived $K_{UAS\_Sess}$ ID matches with the received $K_{UAS\_Sess}$ ID, and if both matches, the UAV 106 derives the CCEK and CCIK from the newly derived UAS Session Key, similar to the UFES 155 and/or the USS/UTM 157 as specified in step 1 above. In such an embodiment, the UAV 106 uses the newly derived CCIK to verify the integrity of the received C2 Security mode command message and if the integrity verification is successful, the UAV 106 performs step 4.

At step 4, in one embodiment, (see messaging 310 and 312) the UAV 106 sends the C2 Security mode complete message to the UFES 155 and/or the USS/UTM 157 either directly or via 3GPP network function(s) 301 (for example AMF 143, UFES 155, or the like), where the 3GPP NF(s) 301 forward the received C2 Security mode complete message to the USS/UTM 157. The C2 Security mode complete message, in one embodiment, includes a 'Success Indication' and the freshly derived $K_{UAS\_Sess}$ ID as proof of correct session key possession.

At step 5, in one embodiment, (see block 314) the UFES 155 and/or the USS/UTM 157 receives the C2 Security mode complete message and uses the $K_{UAS\_Sess}$ based CCEK and CCIK to decipher/decrypt and integrity verify the received message. The 'Success Indication' shows that the UAV 106 has set up the session security and $K_{UAS\_Sess}$ ID acts as the proof of possession for the right session key.

At step 6, in one embodiment (see messaging 316), the UAV 106 and the UFES 155 and/or the USS/UTM 157 uses the CCEK and CCIK to protect the C2 communication data (C2 application data/signaling) until the lifetime of the UAS key or UAS Session key.

Figure 4A:
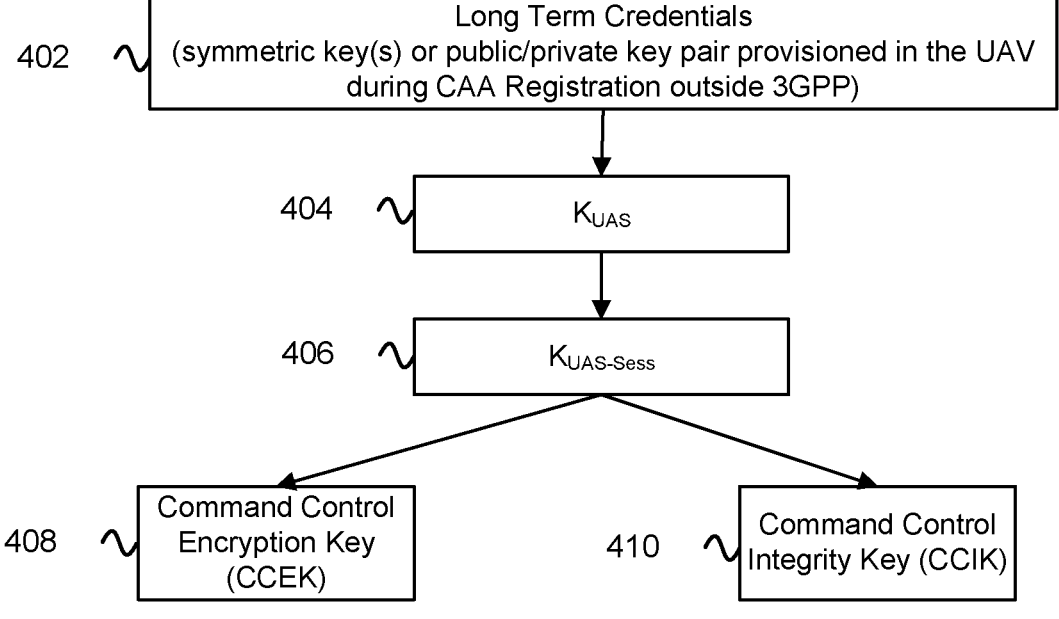
FIG. 4a depicts a first option of a UAS Key Hierarchy.
Figure 4B:
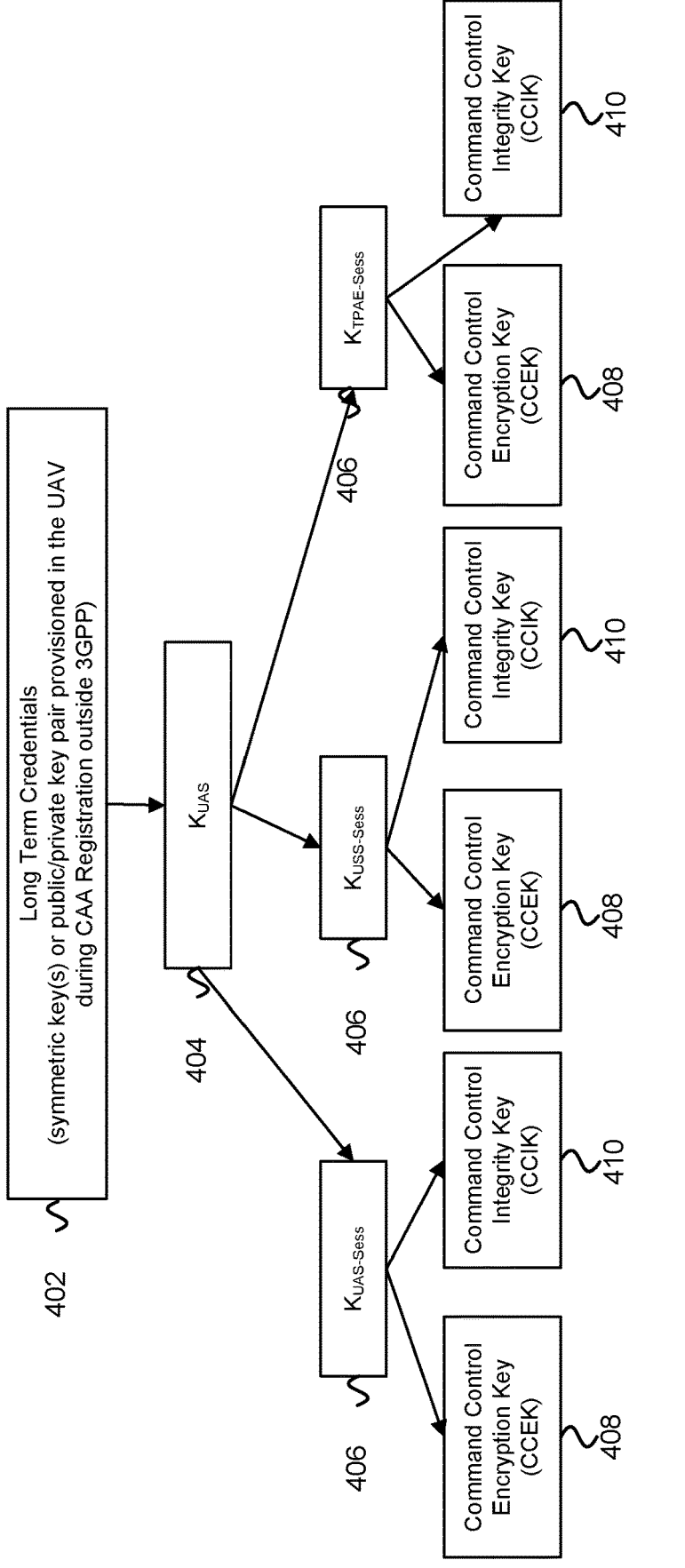
FIG. 4b depicts a second option of a UAS Key Hierarchy.

Regarding the UAS key hierarchy, as shown in FIG. 4a and FIG. 4b, two options are depicted, both of which can be implemented and used for UAS security. The UAS key hierarchy shown here includes the UAS Key ($K_{UAS}$), UAS Session Key ($K_{UAS\_Sess}$) and UAS/C2 protection Keys (e.g., CCEK for Confidentiality protection/Ciphering and CCIK for Integrity protection) that are described in the procedures shown in FIG. 2 and FIG. 3.

The different layers of keys are the following:

Long term credentials 402: These are the credentials that are provisioned at the UAV(s) 106 and form the root of the security of the C2 application layer data. The credentials may include symmetric key(s) or public/private key pair depending on the UAS deployment scenario.

Alternatively, the UAV 106 and corresponding UAV-C 108 in a UAS 101 is provisioned with the same UAS Long Term Credential, which lets the UAV 106 and UAV-C 108 derive the same UAS root key after the UAS authentication.

$K_{UAS}$ 404: This is a root key (e.g., a 256-bit key) that is shared between UAV 106 and UTM/USS 157, and can also be shared with UAV-C 108, TPAE, and UAS Control function/UFES 155 in the 3GPP network, communicating using C2 over UAV3, UAV 4 and UAV 9 interface. It may be refreshed by re-running the authentication signaling using the long-term credentials. In order to generate a $K_{UAS\_Sess}$ (the next layer of keys), Nonce(s) are exchanged between the UAV 106 and UTM/USS 155. $K_{UAS}$ may be kept even when the UAVs 106 have no active C2 communication session. The $K_{UAS}$ ID may be used to identify $K_{UAS}$ $K_{UAS\text{-}sess}$ 406: This is a session key (e.g., a 256-bit key) that is the root of the actual security context that is being used (or at least in the process of being established) to protect the transfer of C2 data between the UAV 106 and UTM/USS 155, between UAV 106 and UAV-C 108, and between UAV 106 and TPAEs. The actual keys that are used in the confidentiality and integrity algorithms may be derived directly from $K_{UAS\text{-}sess}$ The 16-bit $K_{UAS\text{-}sess}$ ID may be used to identify the $K_{UAS}$-sess CCEK 408 and CCIK 410: The C2 Encryption Key (CCPEK) and C2 Integrity Key (CCPIK) (e.g., a 256-bit key) are used along with the chosen confidentiality and integrity algorithms respectively for protecting C2 application data. They are derived from $K_{UAS\text{-}sess}$ key and are refreshed automatically every time $K_{UAS\text{-}sess}$ is changed.

It is noted that, in one embodiment, the UAS root key can be derived by the UAV 106 and UAV-C 108. For UAV-C 108, in one embodiment, alternatively the UAS root key can be provided by the USS/UTM 157. At the network side, in one embodiment, the UAS root key can be derived during a successful UAS Authentication by the USS/UTM 157 or UFES 155. The UAS Session Keys may be derived (as shown in FIGS. 4a and 4b) by the UAV 106, UAV-C 108, USS/UTM 157, UFES 155 and TPAE. For TPAE, alternatively in one embodiment, the UAS Session Key can be provided by the UFES 155. The CCIK and CCEK may be derived by the UAV 106, UAV-C 108, USS/UTM 157, UFES 155, TPAE, and/or the like for C2 protection. Alternatively, for TPAE, the UFES 155 may provide the corresponding CCEK and CCIK.

When calculating $K_{UAS\text{-}sess}$ from $K_{UAS}$, in one embodiment, the following parameters shall be used to form the input S to the key derivation function ("KDF"):

FC=XXXX
P0=Nonce_1
L0=length of Nonce_1 (i.e., 0 ×00 0 ×10)
P1=Nonce_2
L1 =length of Nonce_2 (i.e., 0 ×00 0 ×10)
P2=UAS ID
L2=Length of UAS ID
P3=UAV ID (example CAA Level UAV ID)
L3=Length of UAV ID The input key, in one embodiment, is the 256-bit $K_{UAS}$. For C2 specific $K_{UAS\_Sess}$ derivation for UAV3, UAV4 and UAV9, in one embodiment, the following input is also used in addition to the above inputs.

P4=C2 Type Codes (i.e., to indicate if UAS C2, or USS C2 or TPAE C2)
L4=Length of C2 Type Codes (i.e., to indicate if UAS C2, or USS C2 or TPAE C2)

When calculating a CCIK or CCEK from $K_{UAS\text{-}sess}$, in one embodiment, the following parameters shall be used to form the input S to the KDF:

FC=XXXX
P0=0 ×00 if CCEK is being derived or 0 ×01 if CCIK is being derived
L0=length of P0 (i.e., 0 ×00 0 ×01)
P1=algorithm identity
L1 =length of algorithm identity (i.e., 0 ×00 0 ×01)
P2=C2 Type Codes (i.e., to indicate if UAS C2, or USS C2 or TPAE C2)
L2=Length of C2 Type Codes (i.e., to indicate if UAS C2, or USS C2 or TPAE C2)

In one embodiment, the algorithm identity is set as described in TS 33.501. The input key, in one embodiment, is the 256-bit $K_{UAS\_Sess}$. In one embodiment, for an algorithm key of length n bits, where n is less or equal to 256, the n least significant bits of the 256 bits of the KDF output shall be used as the algorithm key.

In one embodiment, C2 Type Codes can be used to ensure cryptographic separation between the C2 application data security among the UAV— UAV-C pair, UAV— USS/UTM pair and UAV— TPAE pair. The C2 Type Codes, in one embodiment, can either be used as an input in the UAS session key derivation or as an input along with the application data during the confidentiality and integrity protection. Examples of C2 type distinguishers are shown in the table below:

TABLE 1

| C2 Type Distinguishers | |
| --- | --- |
| C2 type distinguisher | Value |
| UAS/UAV-C C2 | 0x01 |
| USS/UTM C2 | 0x02 |
| TPAE C2 | 0x03 |

In one embodiment, the UAS Authentication and Key establishment procedure described in FIG. 2 and the C2 Security Mode Command Procedure described in the FIG. 3 is applicable to EPS/4G as specified step descriptions given above, with the following changes:

Instead of using the AMF 143, the mobility management entity ("MME") is involved in the EPS/4G and instead of a UDM 149, the home subscriber service ("HSS")/authentication center ("AuC") is involved in FIG. 2 and the related step descriptions. Further, in FIG. 2, in one embodiment, an EPS/4G authentication is run (instead of a primary authentication) before UAS authentication.

In FIG. 3 and the related step descriptions, in one embodiment, the MME and UFES 155 are involved as 3GPP network functions.

The key derivation and hierarchy depicted in FIGS. 4a and 4b is also applicable to EPS/4G.

One embodiment of the proposed solution is directed to establishing C2 Security between a UAV 106 and parties such as UAV-C 108, TPAE, and a UTM/USS 157 (e.g., regulators, network operators involved in the UAS). In one embodiment, security can be established for an UAV 106 with various trusted parties (such as USS/UTM 1557, UAV-C 108, TPAE) to enable secured command and control communication for a safe and secured UAV flight operation.

In one embodiment, there are three scenarios in which security need to be set up between a UAV 104 and the trusted parties as listed below:

Security setup between UAV 106 and USS/UTM 157 (e.g., for C2 protection over UAV9 interface)

Security setup between UAV 106 and UAV-C 108 (e.g., for C2 protection over UAV3 interface)

Security setup between UAV 106 and TPAE (e.g., for C2 protection over UAV4 interface)

As compared with embodiment 1, described above, which describes how security is set up between a UAV 106 and a UTM/USS 157, the embodiment described below describes the security set up between the UAV 106 and the UAV-C 108 and the TPAE.

In one embodiment, a new network function is introduced—UAS Control Function ("UCF") otherwise known as a UAS Management Function ("UASMF"), which functions in the 3GPP Network on behalf of UTM/USS 157 to enforce UAS-based control and management operations. UCF/UASMF can be related and equivalent to the UFES 155 and UAS AF, e.g., as defined in TR 23.754. For the ease of readability, the disclosure will use a common terminology UFES 155. Therefore, all the new features and operations described in this disclosure for UFES 155 is applicable to the new 3GPP Network Function UCF.

Figure 5:
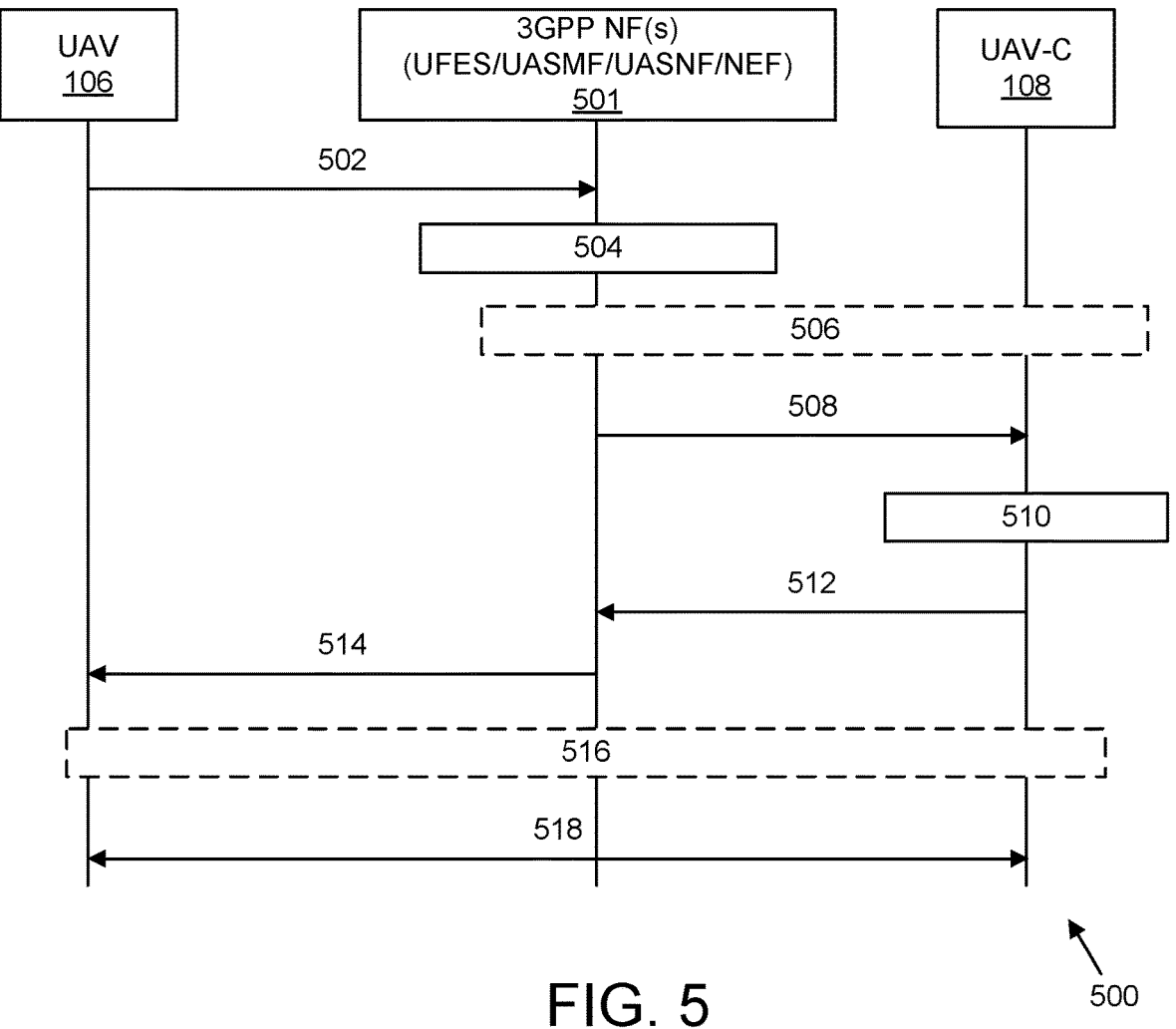
FIG. 5 is a signal flow diagram illustrating a first option of a procedure for Command and Control Security Setup between UAV and UAV-C.

FIG. 5 is a diagram illustrating a signal flow diagram for a procedure 500 directed to a first option for Command and Control Security Setup between UAV 106 and UAV-C 108.

As shown in step 1, in one embodiment, (see messaging 502) the UAV 106 sends a C2 Security Association Request message to UFES 155 (or any 3GPP NF that manages/controls the UAS communication) either directly (e.g., via direct communication using two-way query/response communication) or indirectly over other 3GPP NFs 501, e.g., UFES, UASMF, UASNF, NEF. In one embodiment, the C2 Security Association Request message includes a UAV ID (example CAA UAV ID), a UAV-C ID, a UAS ID (e.g., received during successful UAS authentication), a UAS Authorization Token (e.g., received during successful UAS authentication), $K_{UAS}$ ID/$K_{UAS\_Sess}$ ID, UAV Security Capabilities e.g., (security algorithm Identifiers) and Nonce_1. Alternatively, in one embodiment, UAV 106 and/or UAV-C 108 can send step 1 to UFES 155 or USS/UTM 157. Accordingly, in such an embodiment, for the steps below in this procedure the USS/UTM 157 is involved instead of UFES 155.

At step 2, in one embodiment, (see block 504) the UFES/3GPP NF 501 on receiving the C2 Security Association Request message, uses the received $K_{UAS}$ ID/$K_{UAS\_Sess}$ ID to fetch the UAS/C2 security context that is stored locally.

In one embodiment, the UFES 155 verifies the received UAV ID, UAS ID, and Authorization Token with the locally stored information (e.g., such as CAA level UAV ID, UAS ID and Authorization Token) and if the match is successful, the UFES 155 checks if a 'C2 Association Information' is locally stored for the UAV ID to determine if the corresponding, associated, or paired UAV-C 108 is available for UAS communication; to know the location of the UAV-C 108 (e.g., based on the UAV-C's serving network information); and to check if the UAV-C 108 is already authenticated (e.g., optionally by contacting the UDM/HSS either directly or via the AMF/MME). Based on the authentication result, if the UAV-C 108 is already registered to the network and UAS authenticated, then the UFES 155 forwards the C2 Security Association Request to the UAV-C 108 (e.g., either directly (if the UAV-C 108 lies in the same PLMN) or indirectly (if the UAV-C 108 lies in another PLMN)).

At step 3, in one embodiment, (see block 506) if the UAV-C 108 is registered with the PLMN and it is not yet UAS authenticated or if the UAV-C 108 is not yet registered, then the network perform network initiated PDU session establishment to initiate registration and UAV authentication.

At step 4, in one embodiment, (see messaging 508) the UFES 155 forwards the C2 Security Association Request message and provides the UAS root key and/or the UAS session key to the UAV-C 108. The C2 Security Association Request message may include a UAV ID (e.g., CAA UAV ID), a UAV-C ID, a UAS ID, a UAS Authorization Token, UAV Security Capabilities, $K_{UAS}$ ID/$K_{UAS\_Sess}$ ID and Nonce1.

In one embodiment, sending $K_{UAS}$/$K_{UAS\_Sess}$ to the UAV-C 108 can be skipped if the UAV-C 108 can derive the same UAS root key similar to the UAV 106 after a successful UAS authentication with USS/UTM 157. Otherwise, $K_{UAS}$/$K_{UAS\_Sess}$ may need to be provided to the UAV-C 108 by the UFES 155 during the UAV 106 and UAV-C 108 pairing/ association to enable the same UAS root key availability at the UAV-C 108.

In an alternate embodiment, step 4 can be sent from UAV-C 108 to UFES 155 or USS/UTM 157 to pair or associate the UAV-C 108 with the UAV 106. In this case, step 5 may be executed and then step 4 is sent to the UFES 155 or USS/UTM 157*by* the UAV-C 108.

In one embodiment, at step 5, (see block 510) the UAV-C 108 verifies the received UAV ID, UAS ID, and Authorization Token with the locally stored information (e.g., such as CAA level UAV ID, UAS ID and Authorization Token), and if the match is successful, the UAV-C 108 generates a Nonce_2 to derive the $K_{UAS\text{-}sess}$ Key from the $K_{UAS}$ (e.g., available in the local memory derived after UAS authentication or the one received from the UFES 155), similar to the UAV 106, as shown below:

$K_{UAS\_Sess}$ =KDF ($K_{UAS}$, UAS ID, CAA Level UAV ID, Nonce_1, Nonce_2)

$K_{UAS\_Sess}$ ID: Hash ($K_{UAS\_Sess}$)

CCEK=KDF ($K_{UAS\_Sess}$, UAS ID, Ciphering Algorithm ID, C2 Type ID)

CCIK=KDF ($K_{UAS\_Sess}$, UAS ID, Integrity Algorithm ID, C2 Type ID)

Alternatively, in one embodiment, if the UAV-C 108 receives the $K_{UAS\text{-}Sess}$ Key instead of the $K_{UAS}$ Key from the UFES 155, then the UAV-C 108 uses the received $K_{UAS\_Sess}$ Key for C2 ciphering and integrity protection by deriving the CCEK and CCIK keys from the $K_{UAS\text{-}Sess}$ Key.

In further embodiments, if the UAV-C 108 receives the UAV Security Capabilities, then the UAV-C 108 selects a Ciphering algorithm and Integrity Algorithm based on its own capabilities and UAV Security Capabilities.

In one embodiment, at step 6, (see messaging 512), the UAV-C 108 sends the C2 Security Association Response message to the UFES 155 which includes the Success Indication, UAS ID, $K_{UAS\text{-}Sess}$ ID, Selected ciphering and integrity algorithm IDs, Nonce_2, and an address (e.g., MAC). The C2 Security Association Response message may be integrity protected with the selected security algorithm and the freshly derived CCIK. In an alternate embodiment, the C2 Security Association Response message may be sent by the UFES 155 or USS/UTM 157 to the UAV-C 108 if a C2 Association Request is received from the UAV-C 108 in step 4.

In one embodiment, at step 7, (see messaging 514) the UFES 155 forwards the C2 Security Association Response message to the UAV 106. At step 8*a*, in one embodiment, the UAV 106 uses the received Nonce_2 to derive the $K_{UAS\text{-}Sess}$ Key from $K_{UAS}$ Key locally stored. Further, in one embodiment, the UAV 106 derives the $K_{UAS\text{-}Sess}$ ID and verifies the newly derived one with the received $K_{UAS\text{-}sess}$ ID. If both matches, the UAV 106 considers the security set up as successful and derives the CCEK and CCIK from the newly derived $K_{UAS\text{-}Sess}$ Key. Further, in one embodiment, the UAV 106 uses the CCIK to verify the integrity of the received C2 Security Association Response message by checking the received MAC. The successful MAC verification also confirms the successful set of C2 security between UAV 106 and UAV-C 108. Key derivation is as follows:

$K_{UAS\_Sess}$ =KDF ($K_{UAS}$, UAS ID, CAA Level UAV ID, Nonce_1, Nonce_2)

$K_{UAS\_Sess}$ ID: Hash ($K_{UAS\_Sess}$)

CCEK=KDF ($K_{UAS\_Sess}$, UAS ID, Ciphering Algorithm ID, C2 Type ID)

CCIK=KDF ($K_{UAS\_Sess}$, UAS ID, Integrity Algorithm ID, C2 Type ID)

As step 8*b*, in one embodiment, (see messaging 518) the UAV 106 and UAV-C 108 exchange C2 application data protected with CCEK and CCIK.

Figure 6:
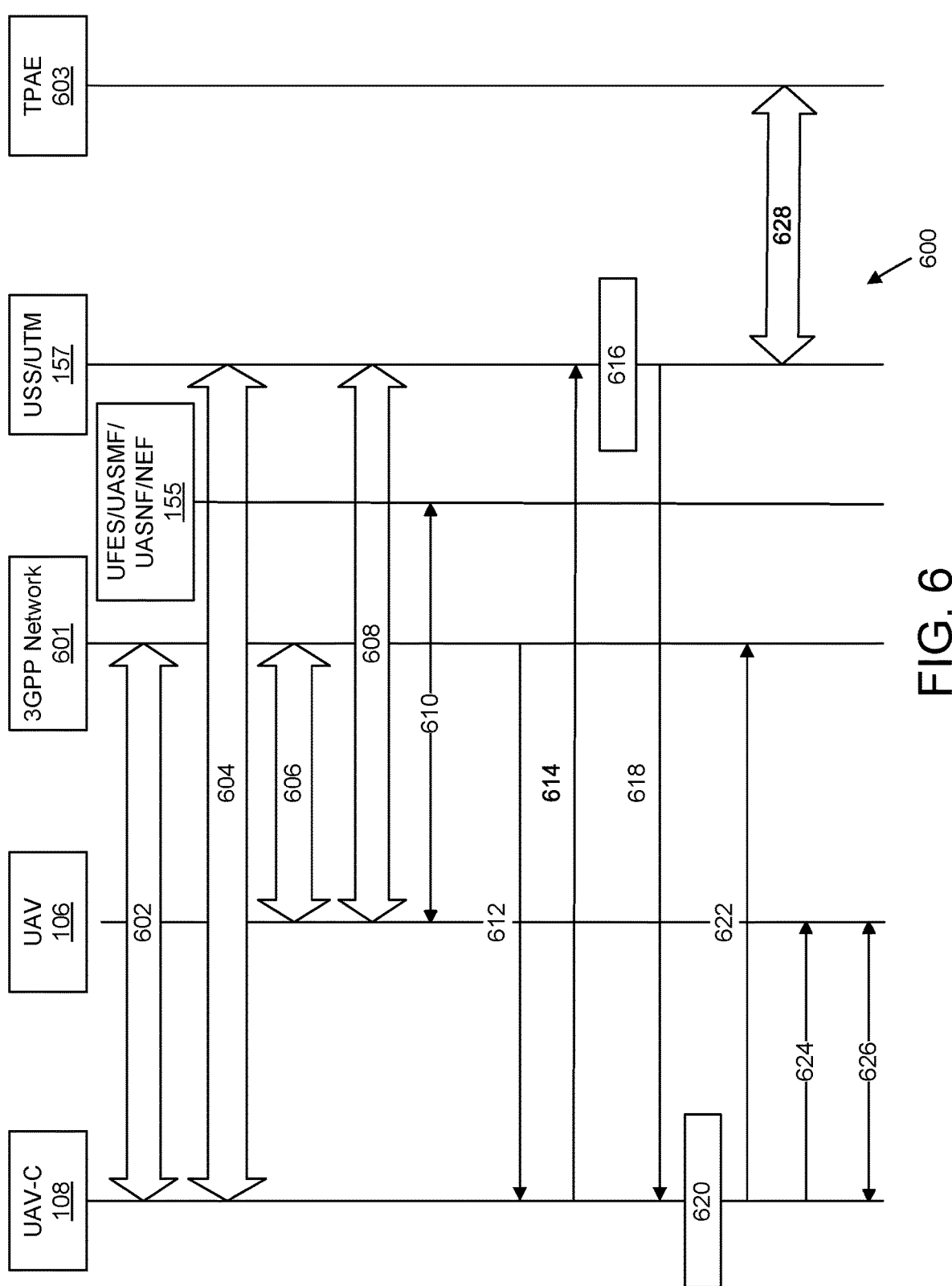
FIG. 6 is a signal flow diagram illustrating a second option of a procedure for Command and Control Security Setup between UAV and UAV-C.

FIG. 6 is a diagram illustrating a signal flow diagram for a procedure 600 directed to a second option for Command and Control Security Setup between UAV 106 and UAV-C 108.

At steps 1*a*-1*b*, in one embodiment (see messaging 602 and 604) the UAV-C 108 is registered with the PLMN and has successfully performed UAS authentication with the USS/UTM 157. At steps 2*a*-2*b*, in one embodiment, (see messaging 606 and 608) the UAV 106 is registered with the PLMN and has successfully performed UAS authentication with the USS/UTM 157. The UAV 106, in one embodiment, holds the UAS root Key ($K_{UAS}$), UAS ID, $K_{UAS}$ ID, and Authorization Token as part of a UAS Security context.

At step 2*c*, in one embodiment, (see messaging 610) the UAV 106 and UFES 155 (e.g., UFES, UASMF, UASNF, NEF) or USS/UTM 157 have successfully performed Security setup and the C2 security is established between the UAV 106 and UFES 155 or USS/UTM 157 using the $K_{UAS\text{-}sess}$ Key (as described and shown with reference to FIG. 3).

At step 3*a*, in one embodiment, (see messaging 612) the 3GPP network Function (AMF 143/UFES 155 in case of 5G network or MME/UFES in case of 4G network) determines to associate the C2 connection and C2 security setup between UAV 106 and UAV-C 108. In such an embodiment, the 3GPP NF 601 sends the C2/UAS Association Request message to the UAV-C 108 on behalf of the UAV 106. The UAS Association Request message may include a UAV ID, UAV Security Capabilities, an Authorization Token, a UAS ID, and a $K_{UAS}$ ID.

At step 3*b*, in one embodiment, (see messaging 614) the UAV-C 108 sends the C2 Security Context Setup Request message to the USS/UTM 155. The C2 Security Context Setup Request message may include the received UAV ID, Authorization Token, UAS ID, and $K_{UAS}$ ID.

At step 3*c*, in one embodiment, (see block 616) the USS/UTM 155 verifies the received UAV ID, Authorization Token, UAS ID, and $K_{UAS}$ ID with the locally stored UAS Security Information, which is identified using the UAS ID, and if both matches, the USS/UTM 155 provides the UAS root key/UAS Session Key to the UAV-C 108.

At step 3*d*, in one embodiment, (see messaging 618) the USS/UTM 155 sends the UAS ID, $K_{UAS}$ ID, Nonce, $K_{UAS}$ Key/$K_{UAS\_Sess}$ Key to the UAV-C 108 in a C2 Security Context Setup Response message. At step 3*e*, in one embodiment, (see block 620) the UAV-C 108 locally stores the received $K_{UAS}$ ID, Nonce, $K_{UAS}$ Key/$K_{UAS\_Sess}$ Key in its memory along with the UAS Context Information that is received (e.g., the UAV ID, UAV Security Capabilities, Authorization Token, UAS ID, $K_{UAS}$ ID) from the UFES 155. If the UAV-C 108 receives the UAS Root key, in one embodiment, the UAV-C 108 derives the UAS session Key and C2 security keys (CCEK, CCIK) as follows:

$K_{UAS\_Sess}$=KDF ($K_{UAS}$, UAS ID, CAA Level UAV ID, Nonce)

$K_{UAS\_Sess}$ ID: Hash ($K_{UAS\_Sess}$)

CCEK=KDF ($K_{UAS\_Sess}$, UAS ID, Ciphering Algorithm ID, C2 Type ID)

CCIK=KDF ($K_{UAS\_Sess}$, UAS ID, Integrity Algorithm ID, C2 Type ID)

In one embodiment, the UAV-C 108 selects the ciphering algorithm and integrity protection algorithm based on its own security capabilities and the UAV's security capabilities. In one embodiment, if the UAV-C 108 receives only the UAS Session Key, the UAV-C 108 derives the CCEK and CCIK from the received UAS Session Key as shown above.

At step 3f, in one embodiment, (see messaging 622) the UAV-C 108 sends the C2/UAS Association Response message to the UFES 155 along with the Success Indication. In one embodiment, at step 3g (see messaging 624) the UAV-C 108 also sends the C2 Association Notification to the UAV 106, wherein the C2 Association Notification message includes $K_{UAS}$ ID, UAV-C ID, Selected Security Algorithm ID(s), $K_{UAS\_Sess}$ ID and MAC. The C2 association notification may be integrity protected with the freshly derived Session Key.

At step 3h, in one embodiment, the UAV 106 and UAV-C 108 successfully establishes the C2 security over UAV3 interface and all C2 application date are protected using the freshly derived CCEK and CCIK.

Figure 7:
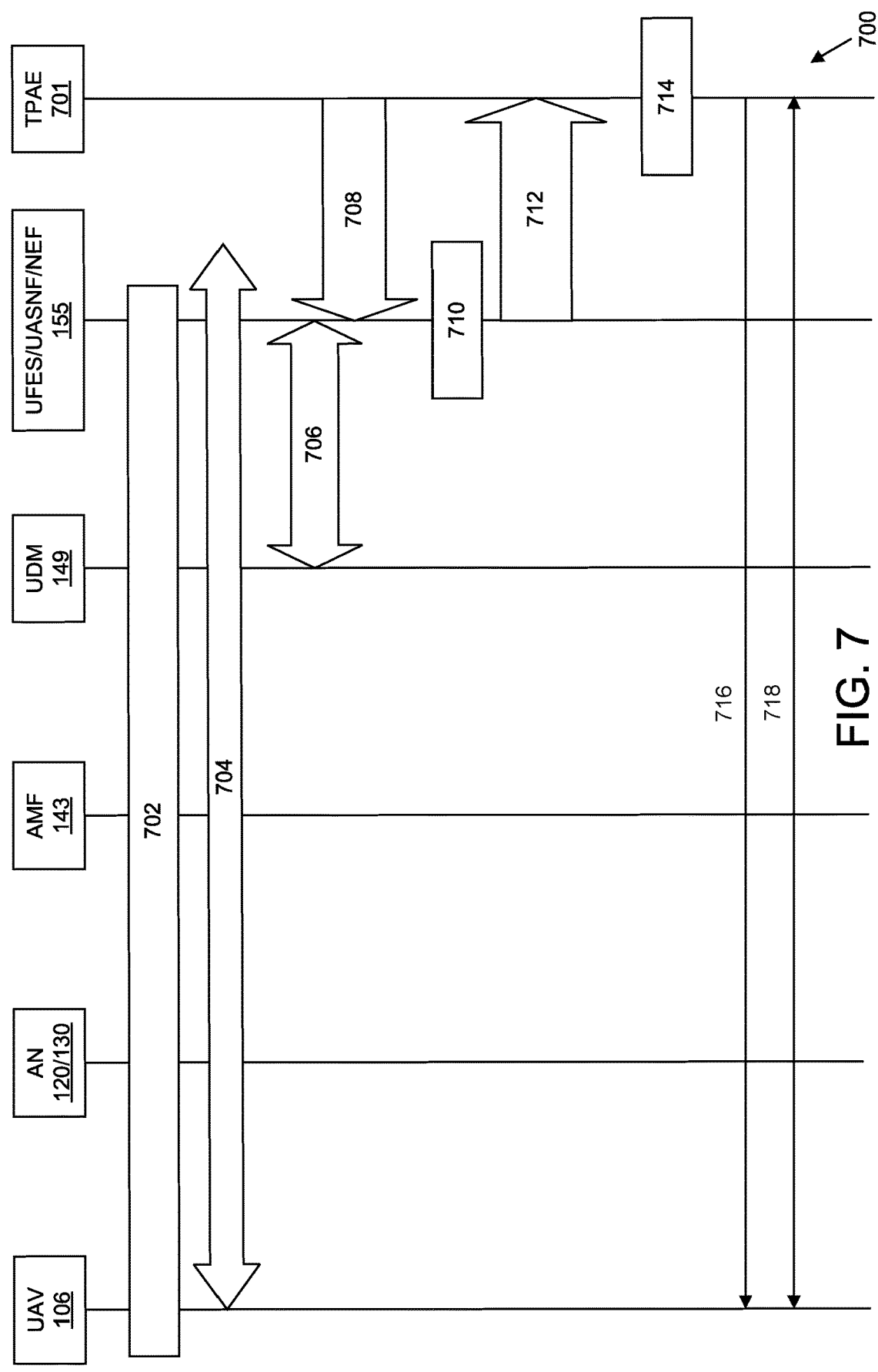
FIG. 7 is a signal flow diagram illustrating one embodiment of a procedure for Command and Control Security Setup Procedure between UAV and TPAE.

FIG. 7 is a diagram illustrating a signal flow diagram for a procedure 700 directed to Command and Control Security Setup between UAV 106 and TPAE 701.

In one embodiment, as one option, the TPAE 701 can establish C2 security setup with UAV 106 using the procedure shown in FIG. 6 by performing steps 3b to 3e to initiate a secured connection over a UAV4 interface, where the TPAE replaces the UAV-C operation.

This embodiment describes how the TPAE 701 establishes C2 Security setup with UAV 106 to protect the C2 application exchange in UAV control. The Security Setup procedure between UAV 106 and TPAE 701 is shown in FIG. 7.

At steps 1-3 (see messaging 702-706), in one embodiment, the UAV 106 is successfully registered with the 3GPP network, and it is successfully UAV authenticated with the USS/UTM 157. The UAV 106, in such an embodiment, started updating its remote identification and tracking information to the USS/UTM 155, which is stored in the UDM 149/HSS via UFES 155 (e.g., UFES/UASNF/NEF).

At step 4, in one embodiment, (see messaging 708) the TPAE 701, if it determines to exchange command and control with any UAV 106, determines to fetch the C2 Security Context (e.g., UAV Security Capabilities/Selected Security Algorithm IDs (Ciphering and Integrity protection Algorithms), UAS ID, $K_{UAS\_Sess}$/CCEK and CCIK) from the UFES 155 and/or USS/UTM 157.

The TPAE 701, in such an embodiment, sends the UAV query to UFES 155 (e.g., either directly or via USS/UTM 157) and/or USS/UTM 157. The UAV query may include a UAV ID, UAS ID, and C2 Security Information Request Indication.

At step 5, in one embodiment, (see block 710) the UFES 155 and/or the UTM/USS 157 fetches the C2 Security Information from its local memory based on UAV ID. Based on the operator's implementation, in one embodiment, the UFES 155 and/or USS/UTM 157 can determine to use either a common UAS Session key or derives TPAE C2 specific UAS Session Key (as shown in FIG. 4a regarding UAS Key Hierarchy). In one embodiment, the UAV C2 Security Information includes the UAV Security Capabilities such as Ciphering and Integrity algorithms, Session Key(s) to protect C2 data message, and/or the like.

At step 6, in one embodiment, (see messaging 712) the UFES 155 (e.g., either directly or via USS/UTM 157) and/or the USS/UTM 157 sends the UAV Response to the TPAE 701, where the UAV Response message includes UAV ID and C2 Security Information. The C2 Security Information, in one embodiment, contains UAV Security Capabilities/

Selected Security Algorithm IDs (e.g., Ciphering and Integrity protection Algorithms), UAS ID, $K_{UAS\_Sess}$/CCEK and CCIK.

At step 7, in one embodiment, (see block 714) the TPAE 701 locally stores the received C2 Security Information along with the UAV ID, if the TPAE 701 received the selected security algorithm and C2 Security Keys (CCEK and CCIK). Alternatively, in one embodiment, if the TPAE 701 receives the $K_{UAS\_Sess}$ Key, the TPAE 701 derives the CCEK and CCIK as follows:

CCEK=KDF ($K_{UAS\_Sess}$, UAS ID/UAV ID, Ciphering Algorithm ID, C2 Type ID ='Value of TPAE C2')

CCIK=KDF ($K_{UAS\_Sess}$, UAS ID/UAV ID, Integrity Algorithm ID, C2 Type ID='Value of TPAE C2').

In one embodiment, if the TPAE 701 received a UAV Security capabilities, then the TPAE 701 selects a ciphering and integrity algorithm for C2 protection based on its own security capabilities and received UAV security capabilities.

At step 8a, in one embodiment, (see messaging 716) the TPAE 701 notifies the UAV 106 by sending the integrity protected C2 security setup notification message with selected algorithms, TPAE C2 Start Indication, and MAC. At step 8b, in one embodiment, (see messaging 718) the TPAE 701 uses the received C2 security keys and selected security algorithm to protect the C2 application data sent to UAV 106.

Figure 8A:
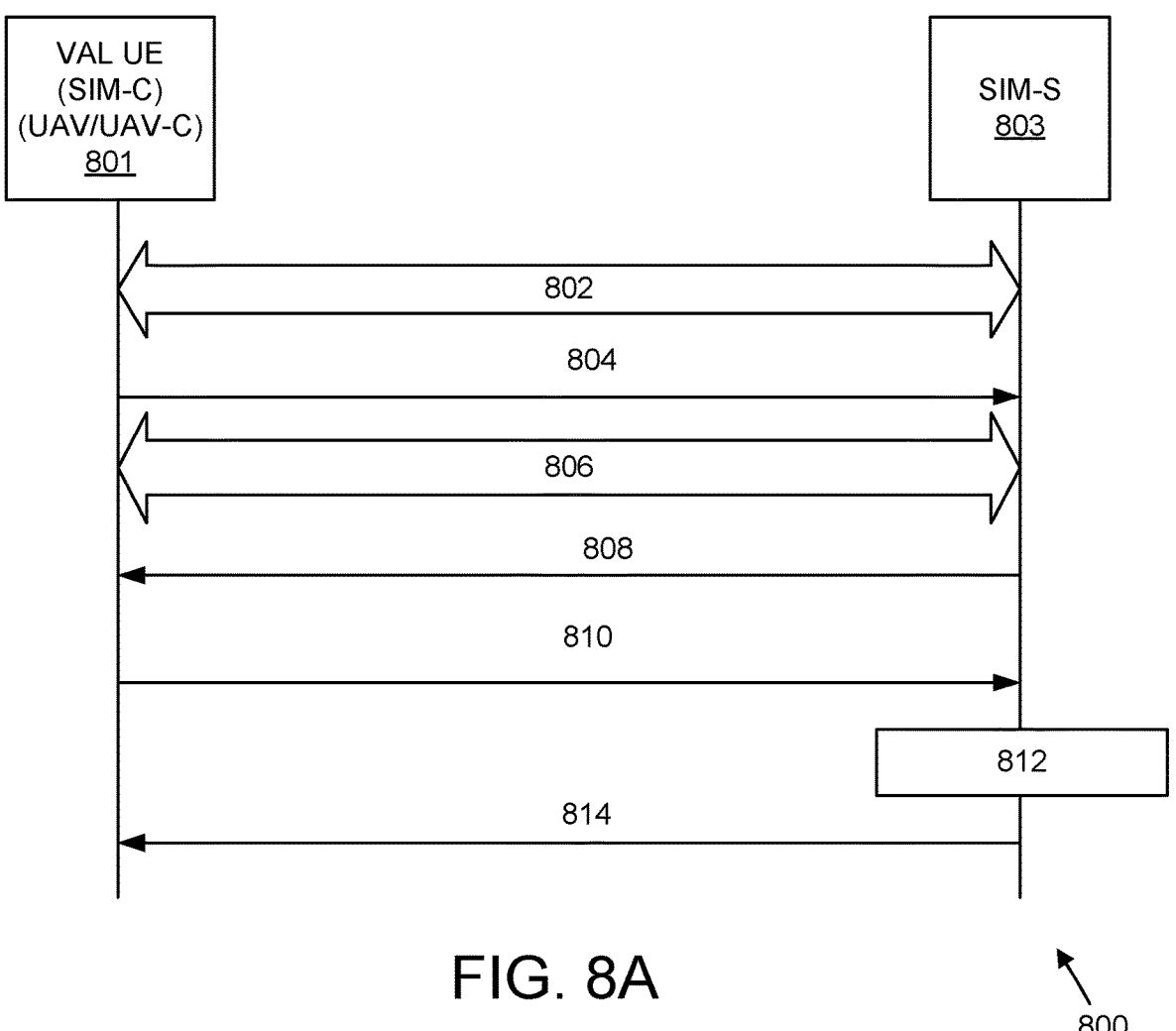
FIG. 8a is a signal flow diagram illustrating one embodiment of a procedure for SEAL based UAS Authentication.

Another embodiment of the solution disclosed herein is directed to a Service Enabler Architecture Layer ("SEAL") based UAV 106 and UAV-C 108 authentication and Key management for secured UAS C2 operations. FIG. 8a shows the SEAL-based Vertical Application Layer ("VAL") user authentication for the UAV 106 and UAV-C 108 in a UAS 101.

At step 1, in one embodiment, (see messaging 802) a VAL UE 801(e.g., UAV 106/UAV-C 108) establishes a secure tunnel with the SIM-S 803 (e.g., USS/UTM 157). In one embodiment, ("SIM-C") SEAL Identity Management Client 801 and ("SIM-S") SEAL Identity Management Server 803 may be involved in the SEAL based UAS authentication procedure.

In one embodiment, at step 2, (see messaging 804) the VAL UE 801 (e.g., UAV 106/UAV-C 108) sends an OpenID Connect Authentication Request to the SIM-S 803 (e.g., USS/UTM 157). The request may contain an indication of authentication methods supported by the UE (e.g., UAV 106/UAV-C 108).

In one embodiment, at step 3, (see messaging 806) User Authentication is performed between VAL UE 801 (e.g., UAV 106/UAV-C 108) and the SIM-S 803 (e.g., USS/UTM 157). In such an embodiment, the primary credentials for user authentication (e.g., biometrics, secureID, OTP, username/password, and/or the like) are based on a VAL service provider policy. The method chosen by the VAL service provider for authentication and authorization may depend on the vertical services and authentication and authorization methods supported by it.

In one embodiment, at step 4 (see messaging 808), the SIM-S 803 (e.g., USS/UTM 157) sends an OpenID Connect Authentication Response to the UE (e.g., UAV 106/UAV-C 108) containing an authorization code. The authorization code can be derived using the UAS ID and UAV CAA Level ID assigned by the USS/UTM 157. At step 5, in one embodiment, (see messaging 810) the VAL UE 801 sends an OpenID Connect Token Request to the SIM-S 803, passing the authorization code.

In one embodiment, at step 6, (see messaging 814) SIM-S 803 (e.g., USS/UTM 157) sends an OpenID Connect Token Response to the VAL UE 801 (e.g., UAV 106/UAV-C 108) containing an ID token and an access token (each which uniquely identify the user of the VAL service). The access token may be derived (see block 812) using the UAS ID and CAA Level UAV ID/UAV-C ID as inputs respectively.

In one embodiment, the ID token is consumed by the UAV 106/UAV-C 108 to personalize the VAL client for the VAL user, and the access token is used by the UAV 106/UAV-C 108 to communicate and authorize the identity of the VAL user to the VAL server(s) and the VAL services.

Figure 8B:
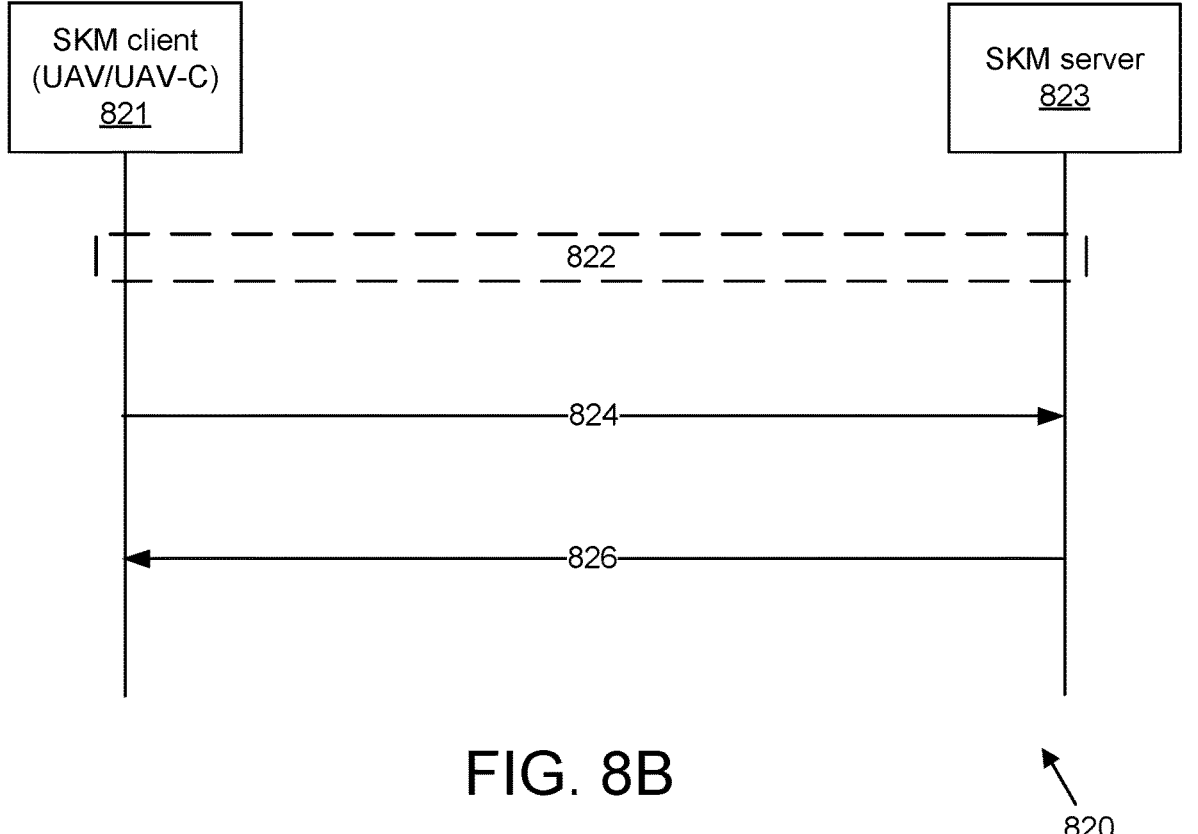
FIG. 8b is a signal flow diagram illustrating one embodiment of a procedure for SEAL based UAS Key Management.

FIG. 8*b* shows the SEAL based SEAL based Key management procedure to establish UAS Security Key/UAS Session Security. In one embodiment, ("SKM-C") SEAL-Key Management Client 821 and ("SKM-S") SEAL Key Management Server 823 are involved in the SEAL based Key management procedure.

At step 1, in one embodiment, (see block 822) The SKM-C 821 (e.g., UAV 106/UAV-C 108) establishes a direct HTTPS connection to the SKM-S 823 (e.g., USS/UTM 157). In certain embodiments, steps 2 and 3 are within this secure connection.

At step 2, in one embodiment, (see messaging 824) the SKM-C 821 sends a SEAL KM Request message to the SKM-S 823 comprising the UAV ID, UAV-C ID and UAS Access Token.

At step 3, in one embodiment, (see messaging 826) the SKM-S 823 authorizes the request and if valid, sends a SEAL KM Response message containing the requested key material (or error code) comprising the UAS ID specific $K_{UAS}/K_{UAS\_Sess}$ Key, $K_{UAS}$ ID/$K_{UAS\_Sess}$ ID, and UAS ID.

As a successful result of this procedure, in one embodiment, the VAL UE or VAL Server has securely obtained service specific key material for use within the VAL system (UAS Application).

Another embodiment of the solution disclosed herein, in one embodiment is directed to Authentication and Key Management for Applications ("AKMA")-based UAS authentication and key management.

This embodiment describes how a UAS Root key can be derived at the 3GPP network from the AKMA Key and provided to the UFES 155 to enable C2 communication security. The rest of the usage of the UAS root key, e.g., the derivation and usage of the UAS session key and C2 Security Keys can be the same as described in Embodiments 1, 2 and 3.

Figure 9:
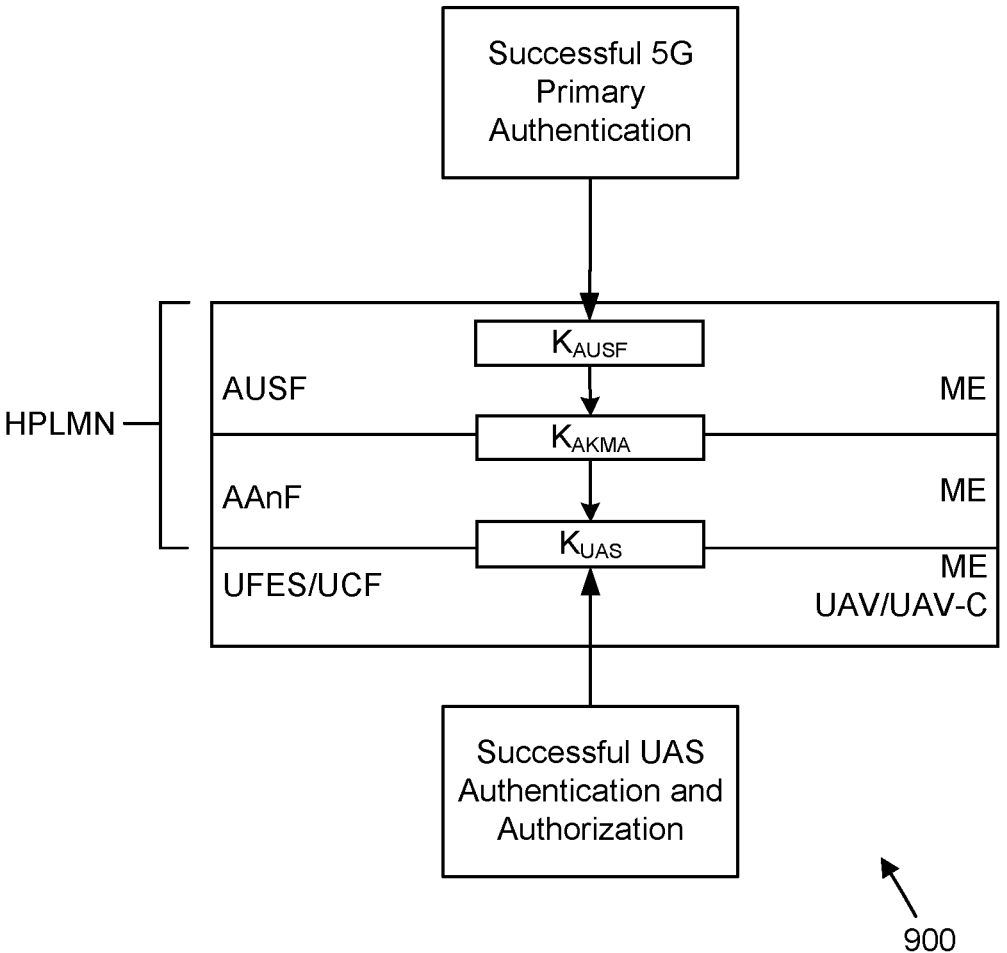
FIG. 9 depicts an embodiment of AKMA based UAS Key Hierarchy.

FIG. 9, in one embodiment, shows how a UAS root key ($K_{UAS}$) can be derived from the $K_{AKMA}$ key available in the AUSF of the 3GPP network after a successful UAS authentication and authorization procedure.

When deriving a $K_{UAS}$ from $K_{AKMA}$, the following parameters shall be used to form the input S to the KDF:

FC=XXX;
P0=AF ID/UFES ID;
L0=length of AF_ID/UFES ID;
P1=UAS ID;
L1 =length of UAS ID The input key, in one embodiment, shall be $K_{AKMA}$.

Figure 10:
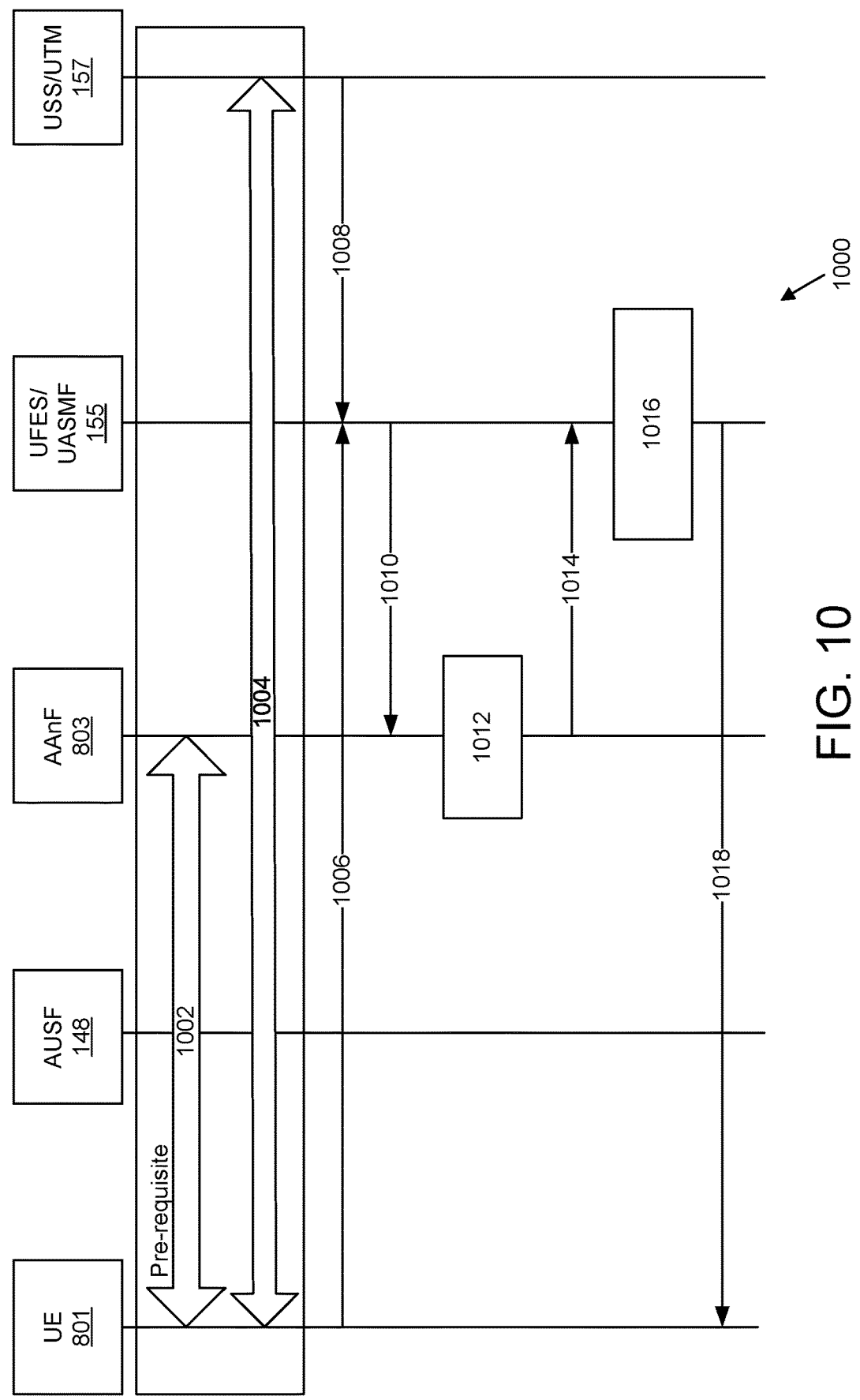
FIG. 10 is a signal flow diagram illustrating one embodiment of a procedure for AKMA based UAS Key generation for C2 Security Establishment.

FIG. 10, in one embodiment, shows the procedure 1000 used by the UFES/UASMF 155 to request C2 application function specific AKMA keys from 5GC directly, when the UFES/UASMF 155 is located in the operator's network. In one embodiment, before communication between the UE 801 (e.g., UAV 106/UAV-C 108) and the UFES 155 (on behalf of USS/UTM 157 and TPAE 701) can start, the UE 801 and the UFES 155 needs to know whether to use AKMA. This knowledge may be implicit to the C2 application on the UE 801 and the UFES 155 (e.g., on behalf of USS/UTM 157 and TPAE 701).

As a prerequisite (see messaging 1002 and 1004), in one embodiment, the UE 801 performs primary authentication and establishes the AKMA anchor key K_AKMA with AAnF 803. In further embodiments, the UE 801 performs UAS authentication and authorization with the USS/UTM 157.

In one embodiment, at step 1, (see messaging 1006 and 1008) when the UE 801 (e.g., UAV 106/UAV-C 108) initiates communication with the UFES 155, it shall include the derived A-KID (AKMA Key Identifier—which is derived from the KAUSF by the AUSF and UE) in the Application Session Establishment request message.

At step 2, in one embodiment, (see messaging 1010) if the UFES 155 does not have an active context associated with the A-KID, then the AF sends a Naanf_AKMA_UASKey request to an AKMA Anchor Function ("AAnF") 803 with the A-KID to request the AKMA Application Key for the UE 801. The UFES 155 also includes its identity (UFES ID) in the request and UAS ID to bind in UAS Root Key derivation. The AAnF 803, in one embodiment, authorizes the UFES 155. The AAnF 803, in some embodiments, checks whether the AAnF 803 can provide the service to the UFES 155 based on the configured local policy or based on the authorization information or policy provided by the NEF/NRF using the UFES 155. If successful, in one embodiment, the following procedures are executed. Otherwise, the AAnF 803 rejects the procedure.

In one embodiment, the AAnF 803 checks whether the subscriber is authorized to use AKMA by the presence of the AKMA anchor key K_AKMA that has been received from the AUSF. In certain embodiments, if the AAnF 803 is in possession of the UAS Application Key ($K_{UAS}$), it responds to the UFES 155 with the $K_{UAS}$. If not, the AAnF 803 may check if it has the UE specific $K_{AKMA}$ key identified by the A-KID. In further embodiments, if $K_{AKMA}$ is available in AAnF 803, the AAnF 803 continues with step 3. In various embodiments, if $K_{AKMA}$ is not available, the AAnF 803 continues with step 4 and sends an error response.

In one embodiment, at step 3, (see block 1012) the AAnF 803 derives the UAS Application Key ($K_{UAS}$) from $K_{AKMA}$. The key derivation of $K_{UAS}$, in one embodiment, is performed using the key derivation function ("KDF") specified in TS 33.220. $K_{UAS}$ is computed as $K_{UAS}$=KDF ($K_{AKMA}$, UFES ID, UAS ID), where the UFES ID is constructed as follows: UFES ID=FQDN of the UFES Ua*/C2 security protocol identifier. The Ua*/C2 security protocol identifier may be specified as Ua security protocol identifier in Annex H of TS 33.220. The key used for the derivation of $K_{UAS}$ is $K_{AKMA}$.

At step 4, in one embodiment, (see messaging 1014) the AAnF 803 sends Naanf_AKMA_UASKey response to the UFES 155 with $K_{UAS}$ and lifetime. At step 5, in one embodiment, (see block 1016) the UFES 155 derives the CCEK and CCIK from the UAS root Key directly or from the UAS Session Key (e.g., where the UAS Session key is derived from the UAS root Key). The UAS session key derivation and the C2 Security Key (CCEK and CCIK) derivation may be based on embodiments previously described above.

At step 6, in one embodiment, (see messaging 1018) the UFES 155 responds to the Application Session Establishment request to the UE 801 with the UAS Session Key ID corresponding to the UAS Session Key derived from the UAS root Key. The C2 security may be set up using an AKMA-based UAS key.

Figure 11:
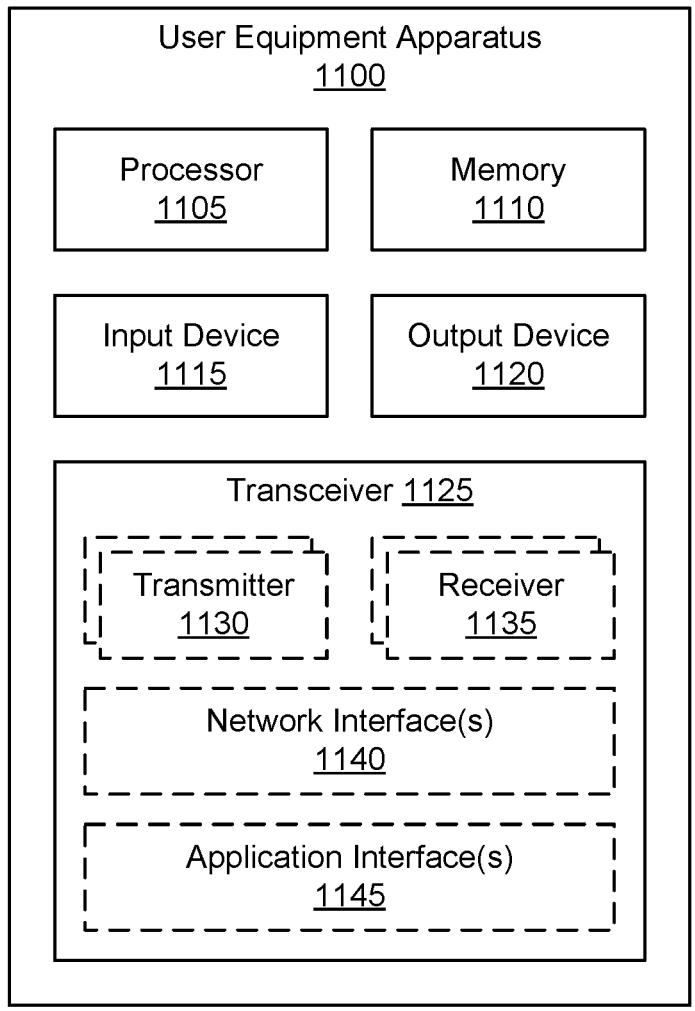
FIG. 11 is a block diagram illustrating one embodiment of a user equipment apparatus that may be used for UAS authentication and security establishment.

FIG. 11 depicts a user equipment apparatus 1100 that may be used for UAS authentication and security establishment, according to embodiments of the disclosure. In various embodiments, the user equipment apparatus 1100 is used to implement one or more of the solutions described above. The user equipment apparatus 1100 may be one embodiment of the remote unit 105 the UE 205, the UAV 106, and/or the UAV-C 108, described above. Furthermore, the user equipment apparatus 1100 may include a processor 1105, a memory 1110, an input device 1115, an output device 1120, and a transceiver 1125.

In some embodiments, the input device 1115 and the output device 1120 are combined into a single device, such as a touchscreen. In certain embodiments, the user equipment apparatus 1100 may not include any input device 1115 and/or output device 1120. In various embodiments, the user equipment apparatus 1100 may include one or more of: the processor 1105, the memory 1110, and the transceiver 1125, and may not include the input device 1115 and/or the output device 1120.

As depicted, the transceiver 1125 includes at least one transmitter 1130 and at least one receiver 1135. In some embodiments, the transceiver 1125 communicates with one or more cells (or wireless coverage areas) supported by one or more base units 121. In various embodiments, the transceiver 1125 is operable on unlicensed spectrum. Moreover, the transceiver 1125 may include multiple UE panel supporting one or more beams. Additionally, the transceiver 1125 may support at least one network interface 1140 and/or application interface 1145. The application interface(s) 1145 may support one or more APIs. The network interface(s) 1140 may support 3GPP reference points, such as Uu, N1, PC5, etc. Other network interfaces 1140 may be supported, as understood by one of ordinary skill in the art.

The processor 1105, in one embodiment, may include any known controller capable of executing computer-readable instructions and/or capable of performing logical operations. For example, the processor 1105 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1105 executes instructions stored in the memory 1110 to perform the methods and routines described herein. The processor 1105 is communicatively coupled to the memory 1110, the input device 1115, the output device 1120, and the transceiver 1125. In certain embodiments, the processor 1105 may include an application processor (also known as "main processor") which manages application-domain and operating system ("OS") functions and a baseband processor (also known as "baseband radio processor") which manages radio functions.

In various embodiments, the processor 1105 and transceiver 1125 control the user equipment apparatus 1100 to implement the above described UE behaviors. For example, a UE may include a UAV 106 and/or a UAV-C 108 that includes a transceiver 1125 that sends, from a first user equipment ("UE") device to a network function of a mobile wireless communication network, a command and control ("C2") pairing request for establishing secure communications between the first UE device and a second UE device, the C2 pairing request comprising at least one of an identifier for the first UE device, an identifier for the second UE device, an identifier for an unmanned aerial system ("UAS") comprising the first and second UE devices, security capability information for the first UE device, a UAS authorization token, a nonce, a UAS Security information identifier, a UAS root key, and a UAS session key identifier.

In one embodiment, the transceiver 1125 receives, from the network function, a C2 pairing response comprising at least one of a success indicator, a UAS session key identifier, a UAS session key, UAS security information, a selected security algorithm, and an address for the second UE device.

In one embodiment, the processor 1105 derives a second UAS session key using a locally-stored UAS root key and a second UAS session key identifier using the second UAS session key, verifies that the second UAS session key identifier matches the UAS session key identifier received in the C2 pairing response, derives at least one security key for securing communications between the first and second UE devices based on the UAS session key, and establishes secure communications with the second UE device using the at least one security key.

In one embodiment, the transceiver 1125 further receives an authentication response message from a second network function of the mobile wireless communication network, the authentication response message comprising at least one or more of: a success indication, a UAV identifier, a UAS identifier, a UAV-C identifier, an authorization token, and a UAS security context.

In one embodiment, in response to receiving the authentication response message with the success indication, the processor 1105 locally stores the UAV identifier, the UAS identifier, a UAV-C identifier, the authorization token, and the received UAS security context and generates the UAS security context using long-term credentials for the UAV, the UAS identifier, and the UAV identifier. In one embodiment, the processor 1105 uses the UAS Security context to establish a secure connection with the USS/UTM.

The memory 1110, in one embodiment, is a computer readable storage medium. In some embodiments, the memory 1110 includes volatile computer storage media. For example, the memory 1110 may include a RAM, including dynamic RAM ("DRAM"), synchronous dynamic RAM ("SDRAM"), and/or static RAM ("SRAM"). In some embodiments, the memory 1110 includes non-volatile computer storage media. For example, the memory 1110 may include a hard disk drive, a flash memory, or any other suitable non-volatile computer storage device. In some embodiments, the memory 1110 includes both volatile and non-volatile computer storage media.

In some embodiments, the memory 1110 stores data related to UAS authentication and security establishment. For example, the memory 1110 may store various parameters, panel/beam configurations, resource assignments, policies, and the like, as described above. In certain embodiments, the memory 1110 also stores program code and related data, such as an operating system or other controller algorithms operating on the user equipment apparatus 1100.

The input device 1115, in one embodiment, may include any known computer input device including a touch panel, a button, a keyboard, a stylus, a microphone, or the like. In some embodiments, the input device 1115 may be integrated with the output device 1120, for example, as a touchscreen or similar touch-sensitive display. In some embodiments, the input device 1115 includes a touchscreen such that text may be input using a virtual keyboard displayed on the touchscreen and/or by handwriting on the touchscreen. In some embodiments, the input device 1115 includes two or more different devices, such as a keyboard and a touch panel.

The output device 1120, in one embodiment, is designed to output visual, audible, and/or haptic signals. In some embodiments, the output device 1120 includes an electronically controllable display or display device capable of outputting visual data to a user. For example, the output device 1120 may include, but is not limited to, an LCD display, an LED display, an OLED display, a projector, or similar display device capable of outputting images, text, or the like to a user. As another, non-limiting, example, the output device 1120 may include a wearable display separate from, but communicatively coupled to, the rest of the user equipment apparatus 1100, such as a smart watch, smart glasses, a heads-up display, or the like. Further, the output device 1120 may be a component of a smart phone, a personal digital assistant, a television, a table computer, a notebook (laptop) computer, a personal computer, a vehicle dashboard, or the like.

In certain embodiments, the output device 1120 includes one or more speakers for producing sound. For example, the output device 1120 may produce an audible alert or notification (e.g., a beep or chime). In some embodiments, the output device 1120 includes one or more haptic devices for producing vibrations, motion, or other haptic feedback. In some embodiments, all, or portions of the output device 1120 may be integrated with the input device 1115. For example, the input device 1115 and output device 1120 may form a touchscreen or similar touch-sensitive display. In other embodiments, the output device 1120 may be located near the input device 1115.

The transceiver 1125 communicates with one or more network functions of a mobile communication network via one or more access networks. The transceiver 1125 operates under the control of the processor 1105 to transmit messages, data, and other signals and also to receive messages, data, and other signals. For example, the processor 1105 may selectively activate the transceiver 1125 (or portions thereof) at particular times in order to send and receive messages.

The transceiver 1125 includes at least transmitter 1130 and at least one receiver 1135. One or more transmitters 1130 may be used to provide UL communication signals to a base unit 121, such as the UL transmissions described herein. Similarly, one or more receivers 1135 may be used to receive DL communication signals from the base unit 121, as described herein. Although only one transmitter 1130 and one receiver 1135 are illustrated, the user equipment apparatus 1100 may have any suitable number of transmitters 1130 and receivers 1135. Further, the transmitter(s) 1130 and the receiver(s) 1135 may be any suitable type of transmitters and receivers. In one embodiment, the transceiver 1125 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1125, transmitters 1130, and receivers 1135 may be implemented as physically separate components that access a shared hardware resource and/or software resource, such as for example, the network interface 1140.

In various embodiments, one or more transmitters 1130 and/or one or more receivers 1135 may be implemented and/or integrated into a single hardware component, such as a multi-transceiver chip, a system-on-a-chip, an ASIC, or other type of hardware component. In certain embodiments, one or more transmitters 1130 and/or one or more receivers 1135 may be implemented and/or integrated into a multi-chip module. In some embodiments, other components such as the network interface 1140 or other hardware components/circuits may be integrated with any number of transmitters 1130 and/or receivers 1135 into a single chip. In such embodiment, the transmitters 1130 and receivers 1135 may be logically configured as a transceiver 1125 that uses one more common control signals or as modular transmitters 1130 and receivers 1135 implemented in the same hardware chip or in a multi-chip module.

Figure 12:
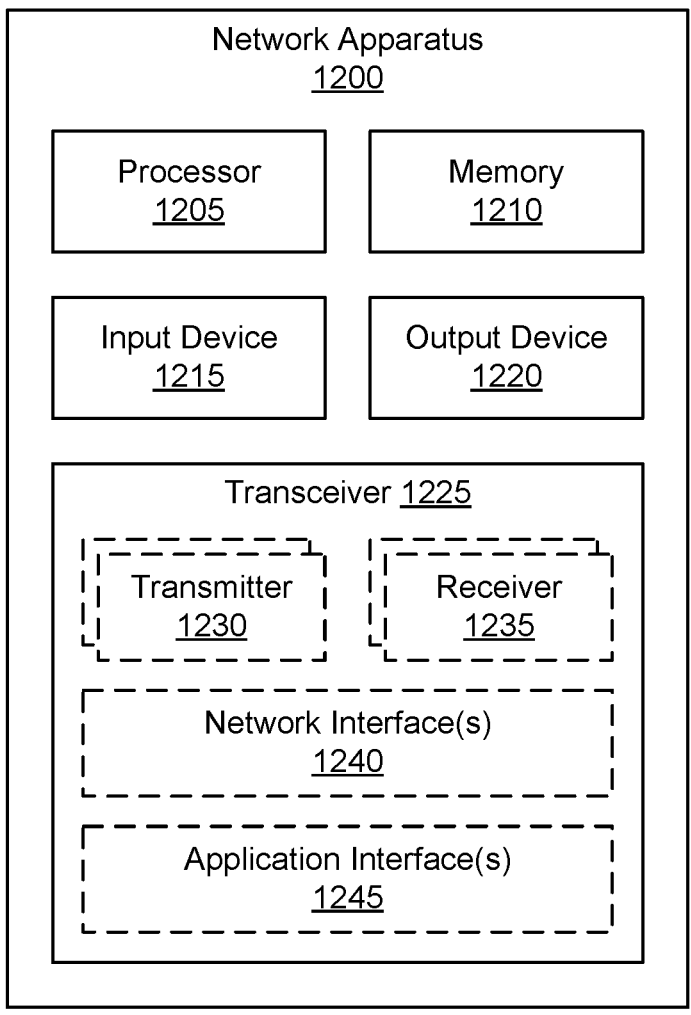
FIG. 12 is a block diagram illustrating one embodiment of a network apparatus that may be used for UAS authentication and security establishment.

FIG. 12 depicts a network apparatus 1200 that may be used for UAS authentication and security establishment, according to embodiments of the disclosure. In one embodiment, network apparatus 1200 may be one implementation of a RAN node, such as the base unit 121, the RAN node 210, or gNB, described above. Furthermore, the base network apparatus 1200 may include a processor 1205, a memory 1210, an input device 1215, an output device 1220, and a transceiver 1225.

In some embodiments, the input device 1215 and the output device 1220 are combined into a single device, such as a touchscreen. In certain embodiments, the network apparatus 1200 may not include any input device 1215 and/or output device 1220. In various embodiments, the network apparatus 1200 may include one or more of: the processor 1205, the memory 1210, and the transceiver 1225, and may not include the input device 1215 and/or the output device 1220.

As depicted, the transceiver 1225 includes at least one transmitter 1230 and at least one receiver 1235. Here, the transceiver 1225 communicates with one or more remote units 105. Additionally, the transceiver 1225 may support at least one network interface 1240 and/or application interface 1245. The application interface(s) 1245 may support one or more APIs. The network interface(s) 1240 may support 3GPP reference points, such as Uu, N1, N2 and N3. Other network interfaces 1240 may be supported, as understood by one of ordinary skill in the art.

The processor 1205, in one embodiment, may include any known controller capable of executing computer-readable instructions and/or capable of performing logical operations. For example, the processor 1205 may be a microcontroller, a microprocessor, a CPU, a GPU, an auxiliary processing unit, a FPGA, or similar programmable controller. In some embodiments, the processor 1205 executes instructions stored in the memory 1210 to perform the methods and routines described herein. The processor 1205 is communicatively coupled to the memory 1210, the input device 1215, the output device 1220, and the transceiver 1225. In certain embodiments, the processor 805 may include an application processor (also known as "main processor") which manages application-domain and operating system ("OS") functions and a baseband processor (also known as "baseband radio processor") which manages radio function.

In various embodiments, the network apparatus 1200 is a UFES or other 3GPP NF (e.g., UASNF), described above. In such embodiments, the transceiver 1225 sends, from a first network function of a mobile wireless communication network, an authentication request message from a user equipment ("UE") to a UAS Service Supplier ("USS")/UAS Traffic Management ("UTM"), the UE comprising at least one of an unmanned aerial vehicle ("UAV") and a UAV controller ("UAV-C"). The transceiver 1225, in certain embodiments, receives, at the first network function from the USS/UTM, an authentication response message comprising a UAS identifier and a UAS security context, the UAS security context comprising a UAS root key and a UAS root key identifier.

In one embodiment, the transceiver 1225 sends, from the first network function, the received authentication response message to an Access and Mobility Management Function ("AMF") of the mobile wireless communication network. In one embodiment, the transceiver 1225 receives the authentication request message from an Access and Mobility Management Function ("AMF") of the mobile wireless communication network, the authentication request message comprising an identifier for the UAV, and the processor 1205 locally stores the UAV identifier at the first network function, wherein the transceiver sends the authentication request message to the USS/UTM in response to receiving the authentication request message.

In various embodiments, the network apparatus 1200 is a UFES, UCF, or other 3GPP NF, described above. In such embodiments, a transceiver 1225 receives, at a network function of a mobile wireless communication network, a command and control ("C2") pairing request from a first user equipment ("UE") device, the C2 pairing request comprising at least one parameter for establishing secure communications between the first UE device and a second UE device.

In one embodiment, the processor 1205 verifies, at the network function, the at least one parameter based on an unmanned aerial system ("UAS") security context that is stored locally at the network function, the UAS comprising the first and second UE devices. In one embodiment, the transceiver 1225 in response to successful verification of the at least one parameter, sends the C2 pairing request to a UAS Service Supplier ("USS")/UAS Traffic Management ("UTM") from the network function, receives, at the network function, a C2 pairing response from the USS/UTM, and sends the C2 pairing response to the first UE device from the network function to establish the secure communications.

In one embodiment, the processor 1205 verifies that the received UAV identifier, UAS identifier, and UAS authorization token match a corresponding UAV identifier, UAS identifier, and UAS authorization token that are stored locally at the first network function, and, in response to a successful match, determines C2 pairing information stored locally at the network function to check: if the UAV and/or the UAV-C are available for UAS communication, a location of the UAV and/or UAV-C, and if the UAV and/or UAV-C are authenticated.

The memory 1210, in one embodiment, is a computer readable storage medium. In some embodiments, the memory 1210 includes volatile computer storage media. For example, the memory 1210 may include a RAM, including dynamic RAM ("DRAM"), synchronous dynamic RAM ("SDRAM"), and/or static RAM ("SRAM"). In some embodiments, the memory 1210 includes non-volatile computer storage media. For example, the memory 1210 may include a hard disk drive, a flash memory, or any other suitable non-volatile computer storage device. In some embodiments, the memory 1210 includes both volatile and non-volatile computer storage media.

In some embodiments, the memory 1210 stores data related to UAS authentication and security establishment. For example, the memory 1210 may store parameters, configurations, resource assignments, policies, and the like, as described above. In certain embodiments, the memory 1210 also stores program code and related data, such as an operating system or other controller algorithms operating on the network apparatus 1200.

The input device 1215, in one embodiment, may include any known computer input device including a touch panel, a button, a keyboard, a stylus, a microphone, or the like. In some embodiments, the input device 1215 may be integrated with the output device 1220, for example, as a touchscreen or similar touch-sensitive display. In some embodiments, the input device 1215 includes a touchscreen such that text may be input using a virtual keyboard displayed on the touchscreen and/or by handwriting on the touchscreen. In some embodiments, the input device 1215 includes two or more different devices, such as a keyboard and a touch panel.

The output device 1220, in one embodiment, is designed to output visual, audible, and/or haptic signals. In some embodiments, the output device 1220 includes an electronically controllable display or display device capable of outputting visual data to a user. For example, the output device 1220 may include, but is not limited to, an LCD display, an LED display, an OLED display, a projector, or similar display device capable of outputting images, text, or the like to a user. As another, non-limiting, example, the output device 1220 may include a wearable display separate from, but communicatively coupled to, the rest of the network apparatus 1200, such as a smart watch, smart glasses, a heads-up display, or the like. Further, the output device 1220 may be a component of a smart phone, a personal digital assistant, a television, a table computer, a notebook (laptop) computer, a personal computer, a vehicle dashboard, or the like.

In certain embodiments, the output device 1220 includes one or more speakers for producing sound. For example, the output device 1220 may produce an audible alert or notification (e.g., a beep or chime). In some embodiments, the output device 1220 includes one or more haptic devices for producing vibrations, motion, or other haptic feedback. In some embodiments, all, or portions of the output device 1220 may be integrated with the input device 1215. For example, the input device 1215 and output device 1220 may form a touchscreen or similar touch-sensitive display. In other embodiments, the output device 1220 may be located near the input device 1215.

The transceiver 1225 includes at least transmitter 1230 and at least one receiver 1235. One or more transmitters 1230 may be used to communicate with the UE, as described herein. Similarly, one or more receivers 1235 may be used to communicate with network functions in the NPN, PLMN and/or RAN, as described herein. Although only one transmitter 1230 and one receiver 1235 are illustrated, the network apparatus 1200 may have any suitable number of transmitters 1230 and receivers 1235. Further, the transmitter(s) 1230 and the receiver(s) 1235 may be any suitable type of transmitters and receivers.

Figure 13:
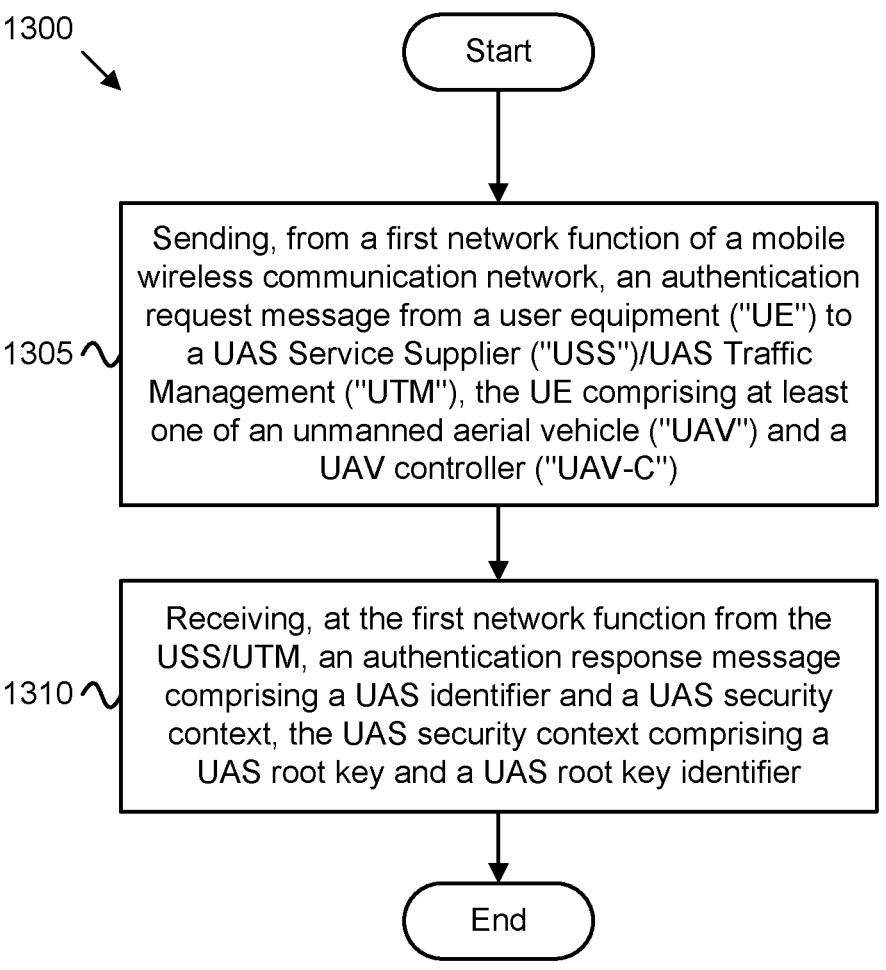
FIG. 13 is a flowchart diagram illustrating one embodiment of a method for UAS authentication and security establishment.

FIG. 13 is a flowchart diagram of a method 1300 for UAS authentication and security establishment. The method 1300 may be performed by a network function such as a UFES 155, a 3GPP network function, and/or the network equipment apparatus 1200. In some embodiments, the method 1300 may be performed by a processor executing program code, for example, a microcontroller, a microprocessor, a CPU, a GPU, an auxiliary processing unit, a FPGA, or the like.

In one embodiment, the method 1300 includes sending 1305, from a first network function of a mobile wireless communication network, an authentication request message from a user equipment ("UE") to a UAS Service Supplier ("USS")/UAS Traffic Management ("UTM"), the UE comprising at least one of an unmanned aerial vehicle ("UAV") and a UAV controller ("UAV-C"). In further embodiments, the method 1300 includes receiving 1310, at the first network function from the USS/UTM, an authentication response message comprising a UAS identifier and a UAS security context, the UAS security context comprising a UAS root key and a UAS root key identifier. The method 1300 ends.

FIG. 14 is a flowchart diagram of a method 1400 for UAS authentication and security establishment. The method 1400 may be performed by a network function such as a UFES 155, a UCF, a 3GPP network function, and/or the network equipment apparatus 1200. In some embodiments, the method 1400 may be performed by a processor executing program code, for example, a microcontroller, a microprocessor, a CPU, a GPU, an auxiliary processing unit, a FPGA, or the like.

In one embodiment, the method 1400 includes receiving 1405, at a network function of a mobile wireless communication network, a command and control ("C2") pairing request from a first user equipment ("UE") device, the C2 pairing request comprising at least one parameter for establishing secure communications between the first UE device and a second UE device.

In one embodiment, the method 1400 includes verifying 1410, at the network function, the at least one parameter based on an unmanned aerial system ("UAS") security context that is stored locally at the network function, the UAS comprising the first and second UE devices. In one embodiment, the method 1400 includes, in response to successful verification of the at least one parameter, sending 1415 the C2 pairing request to a UAS Service Supplier ("USS")/UAS Traffic Management ("UTM") from the network function.

In one embodiment, the method 1400 includes receiving 1420, at the network function, a C2 pairing response from the USS/UTM. In one embodiment, the method 1400 includes sending 1425 the C2 pairing response to the first UE device from the network function to establish the secure communications. The method 1400 ends.

Figure 15:
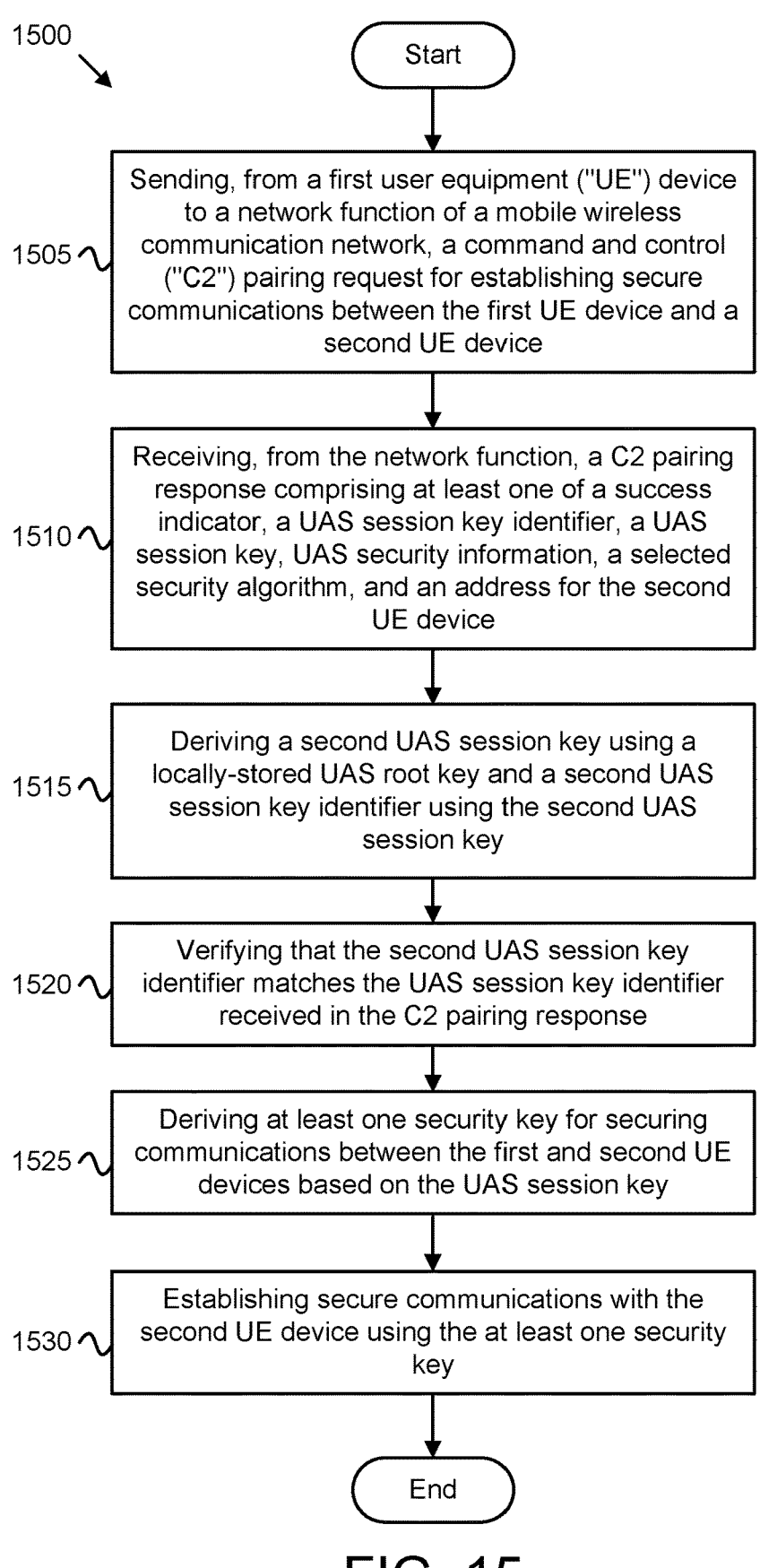
FIG. 15 is a flowchart diagram illustrating one embodiment of a method for UAS authentication and security establishment.

FIG. 15 is a flowchart diagram of a method 1500 for UAS authentication and security establishment. The method 1500 may be performed by a UE such as a UAV 106, UAV-C 108, a remote unit 105, and/or the user equipment apparatus 1100. In some embodiments, the method 1500 may be performed by a processor executing program code, for example, a microcontroller, a microprocessor, a CPU, a GPU, an auxiliary processing unit, a FPGA, or the like.

In one embodiment, the method 1500 includes sending 1505, from a first user equipment ("UE") device to a network function of a mobile wireless communication network, a command and control ("C2") pairing request for establishing secure communications between the first UE device and a second UE device.

In one embodiment, the method 1500 includes receiving 1520, from the network function, a C2 pairing response comprising at least one of a success indicator, a UAS session key identifier, a UAS session key, UAS security information, a selected security algorithm, and an address for the second UE device.

In one embodiment, the method 1500 includes deriving 1515 a second UAS session key using a locally-stored UAS root key and a second UAS session key identifier using the second UAS session key. In one embodiment, the method

1500 includes verifying 1520 that the second UAS session key identifier matches the UAS session key identifier received in the C2 pairing response.

In one embodiment, the method 1500 includes deriving 1525 at least one security key for securing communications between the first and second UE devices based on the UAS session key. In one embodiment, the method 1500 includes establishing 1530 secure communications with the second UE device using the at least one security key. The method 1500 ends.

A first apparatus is disclosed for UAS authentication and security establishment. The first apparatus may include a network function such as a UFES 155, a 3GPP network function, and/or the network equipment apparatus 1200. In some embodiments, the first apparatus may include a processor executing program code, for example, a microcontroller, a microprocessor, a CPU, a GPU, an auxiliary processing unit, a FPGA, or the like.

In one embodiment, the first apparatus includes a transceiver that sends, from a first network function of a mobile wireless communication network, an authentication request message from a user equipment ("UE") to a UAS Service Supplier ("USS")/UAS Traffic Management ("UTM"), the UE comprising at least one of an unmanned aerial vehicle ("UAV") and a UAV controller ("UAV-C"). The transceiver, in certain embodiments, receives, at the first network function from the USS/UTM, an authentication response message comprising a UAS identifier and a UAS security context, the UAS security context comprising a UAS root key and a UAS root key identifier.

In one embodiment, the authentication response message further comprises at least one of an authentication success indication, an identifier for the UAV, command and control ("C2") assistance information, and an authorization token. In one embodiment, the first apparatus includes a processor that locally stores, at the first network function, the authentication success, the received UAV identifier, the UAS identifier, the C2 assistance information, the authorization token, and the UAS security context.

In one embodiment, the C2 assistance information comprises at least one of: an identifier for the UAV-C, a UAV3 type indicator, and a UAV-C serving network identifier. In one embodiment, the transceiver sends, from the first network function, the received authentication response message to an Access and Mobility Management Function ("AMF") of the mobile wireless communication network.

In one embodiment, the transceiver receives the authentication request message from an Access and Mobility Management Function ("AMF") of the mobile wireless communication network, the authentication request message comprising an identifier for the UAV, and the processor locally stores the UAV identifier at the first network function, wherein the transceiver sends the authentication request message to the USS/UTM in response to receiving the authentication request message.

A first method is disclosed for UAS authentication and security establishment. The first method may be performed by a network function such as a UFES 155, a 3GPP network function, and/or the network equipment apparatus 1200. In some embodiments, the first method may be performed by a processor executing program code, for example, a microcontroller, a microprocessor, a CPU, a GPU, an auxiliary processing unit, a FPGA, or the like.

In one embodiment, the first method includes sending, from a first network function of a mobile wireless communication network, an authentication request message from a user equipment ("UE") to a UAS Service Supplier ("USS")/

UAS Traffic Management ("UTM"), the UE comprising at least one of an unmanned aerial vehicle ("UAV") and a UAV controller ("UAV-C"). The first method includes, in certain embodiments, receiving, at the first network function from the USS/UTM, an authentication response message comprising a UAS identifier and a UAS security context, the UAS security context comprising a UAS root key and a UAS root key identifier.

In one embodiment, the authentication response message further comprises at least one of an authentication success indication, an identifier for the UAV, command and control ("C2") assistance information, and an authorization token. In one embodiment, the first method includes locally storing, at the first network function, the authentication success, the received UAV identifier, the UAS identifier, the C2 assistance information, the authorization token, and the UAS security context.

In one embodiment, the C2 assistance information comprises at least one of: an identifier for the UAV-C, a UAV3 type indicator, and a UAV-C serving network identifier. In one embodiment, the first method includes sending, from the first network function, the received authentication response message to an Access and Mobility Management Function ("AMF") of the mobile wireless communication network.

In one embodiment, the first method includes receiving the authentication request message from an Access and Mobility Management Function ("AMF") of the mobile wireless communication network, the authentication request message comprising an identifier for the UAV, locally storing the UAV identifier at the first network function and sending the authentication request message to the USS/UTM in response to receiving the authentication request message.

A second apparatus is disclosed for UAS authentication and security establishment. The second apparatus may include a network function such as a UFES 155, a UCF, a 3GPP network function, and/or the network equipment apparatus 1200. In some embodiments, the second apparatus includes a processor executing program code, for example, a microcontroller, a microprocessor, a CPU, a GPU, an auxiliary processing unit, a FPGA, or the like.

In one embodiment, the second apparatus includes a transceiver that receives, at a network function of a mobile wireless communication network, a command and control ("C2") pairing request from a first user equipment ("UE") device, the C2 pairing request comprising at least one parameter for establishing secure communications between the first UE device and a second UE device.

In one embodiment, the second apparatus includes a processor that verifies, at the network function, the at least one parameter based on an unmanned aerial system ("UAS") security context that is stored locally at the network function, the UAS comprising the first and second UE devices. In one embodiment, the transceiver in response to successful verification of the at least one parameter, sends the C2 pairing request to a UAS Service Supplier ("USS")/UAS Traffic Management ("UTM") from the network function, receives, at the network function, a C2 pairing response from the USS/UTM, and sends the C2 pairing response to the first UE device from the network function to establish the secure communications.

In one embodiment, the first UE device comprises an unmanned aerial vehicle ("UAV") and the second UE device comprises a UAV controller ("UAV-C"), and the first UE device comprises a UAV-C and the second UE device comprises a UAV. In one embodiment, the C2 pairing request comprises at least one of an identifier for the UAV, an identifier for the UAV-C, an identifier for the UAS, security capability information for the UAV, a UAS authorization token, a nonce, a UAS Security information identifier, a UAS root key, and a UAS session key identifier.

In one embodiment, the processor verifies that the received UAV identifier, UAS identifier, and UAS authorization token match a corresponding UAV identifier, UAS identifier, and UAS authorization token that are stored locally at the first network function, and, in response to a successful match, determines C2 pairing information stored locally at the network function to check: if the UAV and/or the UAV-C are available for UAS communication, a location of the UAV and/or UAV-C, and if the UAV and/or UAV-C are authenticated.

In one embodiment, the C2 pairing response comprises at least one of a success indicator, a UAS session key, a UAS session key identifier, UAS security information, a selected security algorithm, and an address for the UAV-C.

A second method is disclosed for UAS authentication and security establishment. The second method may be performed by a network function such as a UFES 155, a UCF, a UASNF, a 3GPP network function, and/or the network equipment apparatus 1200. In some embodiments, the second method may be performed by a processor executing program code, for example, a microcontroller, a microprocessor, a CPU, a GPU, an auxiliary processing unit, a FPGA, or the like.

In one embodiment, the second method includes receiving, at a network function of a mobile wireless communication network, a command and control ("C2") pairing request from a first user equipment ("UE") device, the C2 pairing request comprising at least one parameter for establishing secure communications between the first UE device and a second UE device.

In one embodiment, the second method includes verifying, at the network function, the at least one parameter based on an unmanned aerial system ("UAS") security context that is stored locally at the network function, the UAS comprising the first and second UE devices. In one embodiment, the second method include, in response to successful verification of the at least one parameter, sending the C2 pairing request to a UAS Service Supplier ("USS")/UAS Traffic Management ("UTM") from the network function, receiving, at the network function, a C2 pairing response from the USS/UTM, and sending the C2 pairing response to the first UE device from the network function to establish the secure communications.

In one embodiment, the first UE device comprises an unmanned aerial vehicle ("UAV") and the second UE device comprises a UAV controller ("UAV-C"), and the first UE device comprises a UAV-C and the second UE device comprises a UAV. In one embodiment, the C2 pairing request comprises at least one of an identifier for the UAV, an identifier for the UAV-C, an identifier for the UAS, security capability information for the UAV, a UAS authorization token, a UAS root key, and a UAS session key identifier.

In one embodiment, the second method include verifying that the received UAV identifier, UAS identifier, and UAS authorization token match a corresponding UAV identifier, UAS identifier, and UAS authorization token that are stored locally at the first network function, and, in response to a successful match, determines C2 pairing information stored locally at the network function to check: if the UAV and/or the UAV-C are available for UAS communication, a location of the UAV and/or UAV-C, and if the UAV and/or UAV-C are authenticated.

In one embodiment, the C2 pairing response comprises at least one of a success indicator, a UAS session key, a UAS session key identifier, UAS security information, a selected security algorithm, and an address for the UAV-C.

A third apparatus is disclosed for UAS authentication and security establishment. The third apparatus may include a UE such as a UAV 106, UAV-C 108, a remote unit 105, and/or the user equipment apparatus 1100. In some embodiments, the third apparatus may include a processor executing program code, for example, a microcontroller, a microprocessor, a CPU, a GPU, an auxiliary processing unit, a FPGA, or the like.

In one embodiment, the third apparatus includes a transceiver that sends, from a first user equipment ("UE") device to a network function of a mobile wireless communication network, a command and control ("C2") pairing request for establishing secure communications between the first UE device and a second UE device, the C2 pairing request comprising at least one of an identifier for the first UE device, an identifier for the second UE device, an identifier for an unmanned aerial system ("UAS") comprising the first and second UE devices, security capability information for the first UE device, a UAS authorization token, a nonce, a UAS Security information identifier, a UAS root key, and a UAS session key identifier.

In one embodiment, the transceiver receives, from the network function, a C2 pairing response comprising at least one of a success indicator, a UAS session key identifier, a UAS session key, UAS security information, a selected security algorithm, and an address for the second UE device.

In one embodiment, the third apparatus includes a processor that derives a second UAS session key using a locally-stored UAS root key and a second UAS session key identifier using the second UAS session key, verifies that the second UAS session key identifier matches the UAS session key identifier received in the C2 pairing response, derives at least one security key for securing communications between the first and second UE devices based on the UAS session key, and establishes secure communications with the second UE device using the at least one security key.

In one embodiment, the transceiver further receives an authentication response message from a second network function of the mobile wireless communication network, the authentication response message comprising at least one or more of: a success indication, a UAV identifier, a UAS identifier, a UAV-C identifier, an authorization token, and a UAS security context.

In one embodiment, in response to receiving the authentication response message with the success indication, the processor locally stores the UAV identifier, the UAS identifier, a UAV-C identifier, the authorization token, and the received UAS security context and generates the UAS security context using long-term credentials for the UAV, the UAS identifier, and the UAV identifier. In one embodiment, the processor uses the UAS Security context to establish a secure connection with the USS/UTM.

A third method is disclosed for UAS authentication and security establishment. The third method may be performed by a UE such as a UAV 106, UAV-C 108, a remote unit 105, and/or the user equipment apparatus 1100. In some embodiments, the third method may be performed by a processor executing program code, for example, a microcontroller, a microprocessor, a CPU, a GPU, an auxiliary processing unit, a FPGA, or the like.

In one embodiment, the third method includes sending, from a first user equipment ("UE") device to a network function of a mobile wireless communication network, a command and control ("C2") pairing request for establishing secure communications between the first UE device and a second UE device, the C2 pairing request comprising at least one of an identifier for the first UE device, an identifier for the second UE device, an identifier for an unmanned aerial system ("UAS") comprising the first and second UE devices, security capability information for the first UE device, a UAS authorization token, a UAS root key, and a UAS session key identifier.

In one embodiment, the third method includes receiving, from the network function, a C2 pairing response comprising at least one of a success indicator, a UAS session key identifier, a UAS session key, UAS security information, a selected security algorithm, and an address for the second UE device.

In one embodiment, the third method includes deriving a second UAS session key using a locally-stored UAS root key and a second UAS session key identifier using the second UAS session key, verifying that the second UAS session key identifier matches the UAS session key identifier received in the C2 pairing response, deriving at least one security key for securing communications between the first and second UE devices based on the UAS session key, and establishing secure communications with the second UE device using the at least one security key.

In one embodiment, the third method includes receiving an authentication response message from a second network function of the mobile wireless communication network, the authentication response message comprising at least one or more of: a success indication, a UAV identifier, a UAS identifier, a UAV-C identifier, an authorization token, and a UAS security context.

In one embodiment, in response to receiving the authentication response message with the success indication, the third method includes locally storing the UAV identifier, the UAS identifier, a UAV-C identifier, the authorization token, and the received UAS security context and generates the UAS security context using long-term credentials for the UAV, the UAS identifier, and the UAV identifier. In one embodiment, the third method includes using the UAS Security context to establish a secure connection with the USS/UTM.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A network equipment (NE), comprising:
at least one memory; and
at least one processor coupled with the at least one memory and configured to cause the NE to:
transmit, from a first network function, an unmanned aerial system (UAS) authentication request message associated with a user equipment (UE) to a UAS Service Supplier (USS) or a UAS Traffic Management (UTM) entity, the UE comprising an unmanned aerial vehicle (UAV) or a UAV controller (UAV-C), wherein the UAS authentication request message comprises a civil aviation authority (CAA)-level UAV identifier used by the USS or UTM to authenticate the UE;
receive, at the first network function from the USS or UTM entity, a UAS authentication response message comprising a UAS identifier and a UAS security context comprising a UAS root key and a UAS root key identifier; and store, at the first network function, the UAS identifier and the UAS security context.

2. The NE of claim 1, wherein the UAS authentication response message further comprises at least one of an authentication success indication, an identifier for the UAV, command and control (C2) assistance information, and an authorization token.

3. The NE of claim 2, wherein the processor is configured to cause the NE to locally store, at the first network function, the authentication success indication, the identifier for the UAV, the UAS identifier, the C2 assistance information, the authorization token, and the UAS security context.

4. The NE of claim 2, wherein the C2 assistance information comprises at least one of: an identifier for the UAV-C, a UAV3 type indicator, and a UAV-C serving network identifier.

5. The NE of claim 2, wherein the processor is configured to cause the NE to send, from the first network function, the UAS authentication response message to an Access and Mobility Management Function (AMF).

6. The apparatus NE of claim 1, wherein the processor is configured to cause the NE to:

receive the UAS authentication request message from an Access and Mobility Management Function (AMF), the UAS authentication request message comprising an identifier for the UAV;

locally store the identifier for the UAV at the first network function; and send the UAS authentication request message to the USS or UTM entity in response to receiving the UAS authentication request message.

7. A method performed by a network equipment (NE), comprising:

transmitting, from a first network function, an unmanned aerial system (UAS) authentication request message associated with a user equipment (UE) to a UAS Service Supplier (USS) or a UAS Traffic Management (UTM) entity, the UE comprising an unmanned aerial vehicle (UAV) or a UAV controller (UAV-C), wherein the UAS authentication request message comprises a civil aviation authority (CAA)-level UAV identifier used by the USS or UTM to authenticate the UE;

receiving, at the first network function from the USS or UTM entity, a UAS authentication response message comprising a UAS identifier and a UAS security context comprising a UAS root key and a UAS root key identifier; and storing, at the first network function, the UAS identifier and the UAS security context.

8. The method of claim 7, wherein the UAS authentication response message further comprises at least one of an authentication success indication, an identifier for the UAV, command and control (C2) assistance information, and an authorization token.

9. The method of claim 8, further comprising locally storing, at the first network function, the authentication success indication, the identifier for the UAV, the UAS identifier, the C2 assistance information, the authorization token, and the UAS security context.

10. The method of claim 8, wherein the C2 assistance information comprises at least one of: an identifier for the UAV-C, a UAV3 type indicator, and a UAV-C serving network identifier.

11. The method of claim 8, wherein the processor is configured to cause the NE to send, from the first network function, the UAS authentication response message to an Access and Mobility Management Function (AMF).

12. The method of claim 7, further comprising:

receiving the UAS authentication request message from an Access and Mobility Management Function (AMF), the UAS authentication request message comprising an identifier for the UAV;

locally storing the identifier for the UAV at the first network function; and sending the UAS authentication request message to the USS or UTM entity in response to receiving the UAS authentication request message.

* * * * *